United States Patent
Ohashi et al.

(10) Patent No.: US 8,493,314 B2
(45) Date of Patent: Jul. 23, 2013

(54) BACKLIGHT UNIT AND LIQUID CRYSTAL DISPLAY

(75) Inventors: Yusuke Ohashi, Kanagawa (JP); Yukito Saitoh, Kanagawa (JP); Junichi Hirakata, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 491 days.

(21) Appl. No.: 12/664,009

(22) PCT Filed: Jun. 11, 2008

(86) PCT No.: PCT/JP2008/060684
§ 371 (c)(1),
(2), (4) Date: Oct. 12, 2009

(87) PCT Pub. No.: WO2008/153058
PCT Pub. Date: Dec. 18, 2008

(65) Prior Publication Data
US 2010/0188324 A1  Jul. 29, 2010

(30) Foreign Application Priority Data

Jun. 12, 2007 (JP) ................................ 2007-155087
Sep. 28, 2007 (JP) ................................ 2007-256683
Jun. 10, 2008 (JP) ................................ 2008-151376

(51) Int. Cl.
*G09G 3/36* (2006.01)
(52) U.S. Cl.
USPC ........................................................ 345/102
(58) Field of Classification Search
USPC .............. 345/101, 102; 349/62, 64; 362/600, 362/620; 385/146
See application file for complete search history.

(56) References Cited

U.S. PATENT DOCUMENTS 6,950,220 B2 * 9/2005 Abramson et al. ............ 359/265
2003/0218708 A1 * 11/2003 Ichihashi ...................... 349/115

(Continued)

FOREIGN PATENT DOCUMENTS

JP 2005-249942 A 9/2005
JP 2005-327682 A 11/2005

(Continued)

OTHER PUBLICATIONS

International Search Report (PCT/ISA/210), issued in PCT/JP2008/060684, dated Sep. 9, 2008.

(Continued)

*Primary Examiner* — Quan-Zhen Wang
*Assistant Examiner* — Calvin C Ma
(74) *Attorney, Agent, or Firm* — Sughrue Mion, PLLC

(57) ABSTRACT

Disclosed are a backlight unit and a liquid crystal display capable of improving viewing angle dependency of tint of a liquid crystal display image, thereby obtaining a high-quality liquid crystal display image with no tint when viewed from a slanting direction. A backlight unit 200 of a just-beneath type with a plurality of light sources arranged below a light emission surface 38 includes a light emission spectrum controlling unit 53 for controlling separately light emission spectra in a front direction which becomes a normal direction to the light emission surface 38 and a slanting direction inclined at a predetermined angle from the front direction. The plurality of light sources are a plurality of LED light sources which are different in a light emission color, and each LED light source includes a first LED element with the front direction as an optical axis of emission light and a second LED element with the slanting direction as an optical axis of emission light for each light emission color. The light emission spectrum controlling unit 53 changes light emission intensity of the second LED element for each light emission color.

13 Claims, 25 Drawing Sheets

U.S. PATENT DOCUMENTS

| | | | | |
|---|---|---|---|---|
| 2004/0032675 A1* | 2/2004 | Weller et al. | | 359/872 |
| 2007/0211013 A1* | 9/2007 | Uehara et al. | | 345/102 |
| 2007/0229451 A1* | 10/2007 | Kusuno | | 345/102 |
| 2007/0284566 A1* | 12/2007 | Tada et al. | | 257/13 |
| 2008/0029687 A1 | 2/2008 | Kaihotsu | | |
| 2009/0273727 A1* | 11/2009 | Kubota et al. | | 349/62 |

FOREIGN PATENT DOCUMENTS

| | | |
|---|---|---|
| JP | 2006-228576 A | 8/2006 |
| JP | WO2006059728 * | 8/2006 |
| JP | 2006-339047 A | 12/2006 |
| WO | 2006/011450 A1 | 2/2006 |
| WO | 2007/083408 A1 | 7/2007 |

OTHER PUBLICATIONS

Chinese Office Action, issued Aug. 1, 2011, in corresponding Chinese Patent Application No. 200880025611.4

Office Action dated May 22, 2012 issued by the Japanese Patent Office in counterpart Japanese Application No. 2008-151376.

* cited by examiner

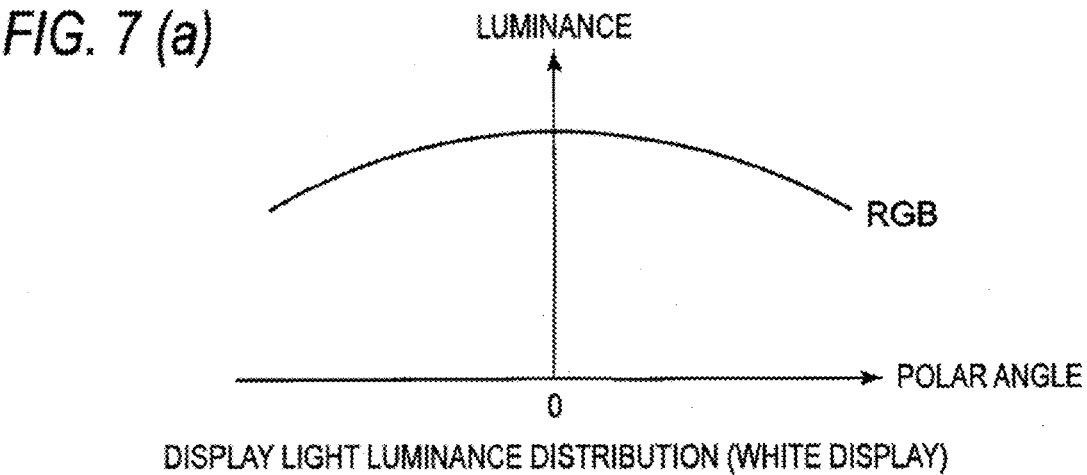
FIG. 7 (a) DISPLAY LIGHT LUMINANCE DISTRIBUTION (WHITE DISPLAY)
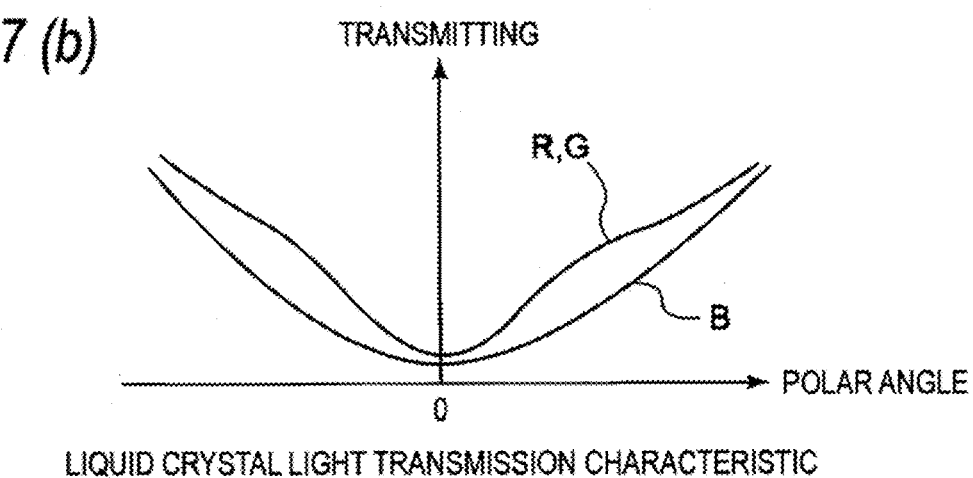
FIG. 7 (b) LIQUID CRYSTAL LIGHT TRANSMISSION CHARACTERISTIC
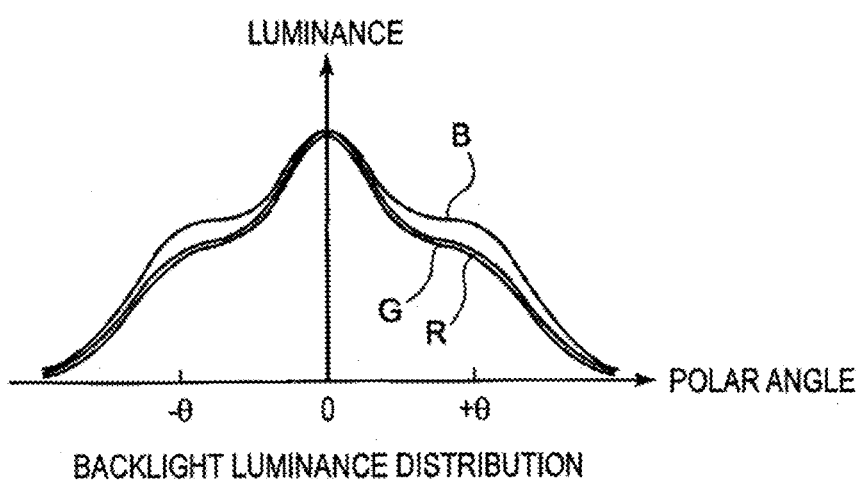
FIG. 7 (c) BACKLIGHT LUMINANCE DISTRIBUTION

BACKLIGHT UNIT AND LIQUID CRYSTAL DISPLAY

TECHNICAL FIELD

The present invention relates to a backlight unit provided at the back of a liquid crystal display panel for lighting a liquid crystal panel, and a liquid crystal display.

BACKGROUND ART

A liquid crystal display includes a backlight unit on the back of a liquid crystal panel for displaying an image for lighting the liquid crystal panel from the back to clearly display the image displayed on the liquid crystal panel. The backlight units are roughly classified into those called an edgelighting type and those called a just-beneath type. The backlight unit of the edgelighting type has a cold cathode fluorescent lamp (CCFL) arranged facing an end face of a light guide plate, in which light incident from the end face is reflected more than once in the light guide plate and light is emitted from the surface of the light guide plate, passes through an optical film, and then is incident on the liquid crystal display panel. On the other hand, the backlight unit of the just-beneath type is made up of a plurality of cold cathode fluorescent lamps arranged in parallel, a reflecting plate provided on the back of the cold cathode fluorescent lamp, a light diffusion plate forming a light emission surface, and an optical film (lens sheet) in combination, wherein light emitted from the surface of the light diffusion plate is passed through the optical film and then is made incident on the liquid crystal display panel. The backlight unit of the just-beneath type can increase the use number of light sources in contrast to the backlight unit of the edgelighting type and thus the light emission surface can be easily put into higher luminance.

Consequently, use of an LED as a light source by adopting the just-beneath type is also proposed for a backlight unit for lighting a liquid crystal panel of a large screen installed in a large-sized electronic machine (see Patent Documents 1 and 2).

The backlight unit of the just-beneath type using LEDs uses LEDs for emitting red light, green light, and blue light of the three primary colors of light as light sources and mixes red light, green light, and blue light emitted from the LEDs to generate white light. Thus, a backlight unit includes a light source section 15 having red LEDs 11R, green LEDs 11G, and blue LEDs 11B arranged alternately in the XY direction on a printed wiring board (PWB) 13, as shown in FIG. 26.

The backlight unit 17 first emits red light, green light, and blue light from the red LEDs 11R, the green LEDs 11G, and the blue LEDs 11B respectively included in the light source section 15 as the sectional structure of the backlight unit 17 shown in FIG. 27. The red light, the green light, and the blue light emitted from the LEDs 11 are naturally mixed into white light while proceeding in the direction in which a diffusion plate 19 and a diffusion sheet 21 are provided, and the light is made incident on a prism sheet 23. The light emitted from the prism sheet 23 lights a liquid crystal panel.

In the backlight unit 17 of the just-beneath type using the LEDs in the related art described above, the red light, the green light, and the blue light emitted from the LEDs 11 are naturally mixed into white light while proceeding in the direction in which the diffusion plate 19 and the diffusion sheet 21 are provided because the luminance distribution of the emission light disperses isotropically.

However, some liquid crystal panels have a liquid crystal light transmission characteristic that the red light, the green light, and the blue light emitted from the LEDs 11 differ in light transmittance in a polar angle direction (slanting direction) inclined at a predetermined angle with respect to the normal perpendicular to a display surface, caused by an optically-compensatory film. Thus, when observing the display surface of the liquid crystal panel from the slanting direction, the colors are not uniformly mixed and there is a problem in that coloration or tinting, which does not occur from the front direction, occurs, namely, a problem of occurrence of viewing angle dependency of tint.

In recent years, with an increase in the size of the liquid crystal display, in particular, in a state where black is displayed, light leakage tends to conspicuously occur at the upper, lower, left, and right ends or at the four corners of a display screen. For this reason, light may leak in a specific visual field direction regardless of the display screen, and in a large liquid crystal display, and deterioration of display quality may be conspicuous.

Patent Document 1: JP-A-2005-327682
Patent Document 2: JP-A-2005-249942

SUMMARY OF INVENTION

Technical Problem

The invention has been finalized in consideration of the above-described situation, and it is an object of the invention to provide a backlight unit and a liquid crystal display capable of improving the viewing angle dependency of tint in a liquid crystal display image, having no tint when viewed from a slanting direction, and improving light leakage, thereby obtaining a high-quality liquid crystal display image.

Solution to Problem

The object of the invention is accomplished by the following configuration.

(1) A backlight unit of a just-beneath type with a plurality of light sources below a light emission surface, the backlight unit including a light emission spectrum controlling unit for separately controlling light emission spectra in a front direction which becomes a normal direction to the light emission surface and a slanting direction inclined at a predetermined angle from the normal direction.

With this backlight unit, the light emission spectra in the front direction and the slanting direction by the light emission spectrum controlling unit are separately controlled, directivity and light emission intensity are controlled separately for each of R, G, and B colors, and chromaticity (spectrum) can be adjusted in the front direction and the slanting direction.

For example, if two second light sources are arranged in the same plane at a predetermined inclination angle from a first light source with the first light source with the optical axis of emission light in the front direction interposed therebetween, adjustment of color allocation symmetrical at both ends with the front direction as a center is made possible. Therefore, chromaticity (spectrum) in the slanting direction from both sides in a horizontal direction of a display screen or in the slanting direction from both sides in a vertical direction of the display screen can be controlled symmetrically, and tint adjustment is facilitated.

(2) The backlight unit described in (1), wherein the plurality of light sources are a plurality of LED elements which are different in a light emission color, and each light source includes a first LED element with the front direction as an optical axis of emission light and a second LED element with the slanting direction as an optical axis of emission light for each light emission color, and the light emission spectrum controlling unit changes light emission intensity for the second LED element for each light emission color.

With this backlight unit, light emission intensity of the LED element in the slanting direction can be adjusted for each light emission color relative to the LED element in the front direction, and chromaticity (spectrum) in the front direction and the slanting direction can be adjusted relatively.

(3) The backlight unit described in (2), wherein a plurality of multi-directional irradiation units each having the first LED element and the second LED element as a single body are dispersed below the light emission surface.

(4) The backlight unit described in (3), wherein the multi-directional irradiation units of light emission colors are arranged in a lattice.

With this backlight unit, chromaticity (spectrum) in the front direction and the slanting direction can be adjusted by each multi-directional irradiation unit, and a uniform light amount distribution on the entire light emission surface can be realized.

(5) The backlight unit described in any one of (2) to (4), wherein the light emission surface is divided into a plurality of blocks, and the light emission spectrum controlling unit controls light emission intensity of the first LED element and the second LED element included in each of the blocks separately for each block.

With this backlight unit, when tint varies from one place of the light emission surface to another, the tint can be controlled in the block units according to the variation and fine control is made possible, as compared with a case where the whole screen is uniformly processed. Therefore, a backlight unit capable of improving display quality can be provided.

(6) The backlight unit described in any one of (1) to (5), wherein an optically-compensatory film having wavelength dependency and transmittance varying according to the position of the light emission surface is arranged on the light emission surface.

With this backlight unit, using the optically-compensatory film having wavelength dependency and transmittance varying according to the position of the light emission surface position, transmission light intensity can be controlled separately for each of R, G, and B colors, spectral transmittance can vary at the center of the display screen where tint change is unlikely to occur and on the periphery of the display screen where tint change is likely to occur, and viewing angle dependency of the tint change of the display screen can be improved.

(7) A liquid crystal display including the backlight unit described in any one of (1) to (6), and a liquid crystal panel arranged facing the backlight unit.

With this liquid crystal display, for a color component insufficient in the slanting direction, for example, in a proper light transmission characteristic caused by the optically-compensatory film of the liquid crystal panel, the light emission spectrum in the slanting direction is controlled separately for each of the R, G, and B colors, so color allocation is adjusted, and viewing angle dependency of tint of a display image is improved. Therefore, even if tint occurs due to the viewing angle characteristic of the liquid crystal panel, the tint change can be improved to produce high-quality image display.

(8) The liquid crystal display described in (7) further includes a light detection unit provided in the liquid crystal panel for detecting light information from the light source emitted from the liquid crystal panel, wherein the light emission spectrum controlling unit changes light emission intensity for the second LED element on the basis of the light information detected by the light detection unit.

With this liquid crystal display, the light emission spectra in the front direction and the slanting direction can be controlled separately with drive control of the light source by the light emission spectrum controlling unit, directivity and light emission intensity can be controlled separately for each of the R, G, and B colors, and chromaticity (spectrum) can be adjusted in the front direction and the slanting direction. Further, leak light due to the light leakage phenomenon at the upper, lower, left, and right ends of the display screen or the four corners of the display screen is detected by the light detection unit, and directivity and light emission intensity are controlled separately for each of the R, G, and B colors so as to cancel leak light.

(9) The liquid crystal display described in (7) further includes a moisture detection unit provided in the liquid crystal panel for detecting moisture information of the liquid crystal panel, wherein the light emission spectrum controlling unit changes light emission intensity for the second LED element on the basis of the moisture information detected by the moisture detection unit.

With this liquid crystal display, the light emission spectra in the front direction and the slanting direction can be controlled with drive control of the light source by the light emission spectrum controlling unit, directivity and light emission intensity can be controlled separately for each of the R, G, and B colors, and chromaticity (spectrum) can be adjusted in the front direction and the slanting direction. Further, the moisture information of the liquid crystal panel is detected by the moisture detection unit, and directivity and light emission intensity are controlled separately for each of the R, G, and B colors so as to cancel changes in the optical characteristic according to the moisture content in the liquid crystal panel.

(10) The liquid crystal display described in (7) further includes a temperature detection unit provided in the liquid crystal panel for detecting temperature information of the liquid crystal panel, wherein the light emission spectrum controlling unit changes light emission intensity for the second LED element on the basis of the temperature information detected by the temperature detection unit.

With this liquid crystal display, the light emission spectra in the front direction and the slanting direction can be controlled with drive control of the light source by the light emission spectrum controlling unit, directivity and light emission intensity can be controlled separately for each of the R, G, and B colors, and chromaticity (spectrum) can be adjusted in the front direction and the slanting direction. Further, the temperature information of the liquid crystal panel is detected by the temperature detection unit, and directivity and light emission intensity are controlled separately for each of the R, G, and B colors so as to cancel changes in the optical characteristic according to the temperature of the liquid crystal panel.

(11) The liquid crystal display described in any one of (7) to (10), wherein an optically-compensatory film having wavelength dependency of transmittance is provided in the liquid crystal panel.

With this liquid crystal display, using the optically-compensatory film having wavelength dependency of transmittance, light emission intensity is controlled separately for each of the R, G, and B colors, and viewing angle dependency of tint change of the display screen is improved.

(12) The liquid crystal display described in (11), wherein the optically-compensatory film is an optically-compensatory film having transmittance varying according to the position of a display surface.

With this liquid crystal display, using the optically-compensatory film having transmittance varying according to the position of the light emission surface, transmission light intensity is controlled separately according to the position of the display surface, spectral transmittance can vary at the center of the display screen where tint change is unlikely to occur and on the periphery of the display screen where tint change is likely to occur, and viewing angle dependency of tint change of the display screen can be improved.

(13) The liquid crystal display described in any one of (7) to (12), wherein the second LED element has the optical axes of emission light controlled in two directions substantially equal in an inclination angle with the front direction as the center in a plane parallel to the front direction, and the liquid crystal panel is a TN (Twisted Nematic) liquid crystal panel.

With this liquid crystal display, a phenomenon in which yellow tint occurs in the lateral direction at the white display time and a phenomenon in which blue tint occurs in the upper direction at the black display time, which are caused by the optically-compensatory film for the TN liquid crystal can be eliminated.

(14) The liquid crystal display described in any one of (7) to (12), wherein the second LED element has the optical axes of emission light controlled in a total of four directions provided by inclining, in a first plane parallel to the front direction, two directions which are controlled to directions substantially equal in an inclination angle with the front direction as the center, at an angle substantially equal in a direction orthogonal to the first plane with the first plane as the center, and the liquid crystal panel is a VA (Vertically Aligned) liquid crystal panel.

With this liquid crystal display, a phenomenon in which purplish red occurs in the slanting direction, caused by the optically-compensatory film for the VA liquid crystal can be eliminated.

Advantageous Effects of Invention

The backlight unit according to the invention includes the light emission spectrum controlling unit for separately controlling light emission spectra in the front direction which becomes the normal direction to the light emission surface and the slanting direction inclined at the predetermined angle from the normal direction. Therefore, directivity and light emission intensity can be controlled separately for each of the R, G, and B colors, chromaticity (spectrum) can be varied in the front direction and the slanting direction, and viewing angle dependency of tint of a display image caused by the optically-compensatory film can be improved.

The liquid crystal display according to the invention includes the above-described backlight unit and the liquid crystal panel arranged facing the backlight unit. Therefore, for the color component insufficient in the slanting direction, for example, in the proper light transmission characteristic caused by the optically-compensatory film of the liquid crystal panel, the light emission spectrum in the slanting direction can be controlled separately for each of the R, G, and B colors, and thus viewing angle dependency of tint of a display image can be improved. In particular, in a black display state on a large display screen, leak light due to a light leaking phenomenon at the upper, lower, left, and right ends of the display surface or at the four corners of the display surface is detected, and directivity and light emission intensity can be controlled separately for each of the R, G, and B colors so as to cancel leak light, thereby improving light leakage. As a result, a high-quality liquid crystal display image with no tint can be obtained even if the display image is viewed from a slanting direction.

BRIEF DESCRIPTION OF DRAWINGS

FIG. 7 (*a*) is a graph showing the luminance distribution of display light of a liquid crystal panel for R, G, and B colors, (b) is a graph showing the light transmission characteristic of the liquid crystal panel, and (c) is a graph showing a backlight luminance distribution.

REFERENCE SIGNS LIST

| | |
|---|---|
| 31: | LIGHT SOURCE |
| 33: | LIGHT SOURCE SECTION |
| 38: | LIGHT EMISSION SURFACE |
| 47: | DISPLAY SURFACE |
| 49, 49A: | CONTROL SECTION |
| 51: | LIQUID CRYSTAL DRIVE SECTION |
| 53: | LIGHT EMISSION LUMINANCE CONTROLLING SECTION (LIGHT EMISSION SPECTRUM CONTROLLING UNIT) |
| 55: | BACKLIGHT DRIVE SECTION |
| 56A: | TABLE DATA STORAGE SECTION |
| 57: | FRONT DIRECTION |
| 59: | SLANTING DIRECTION |
| 61, 61A, 61B: | MULTI-DIRECTIONAL IRRADIATION UNIT |
| 63: | FIRST LED ELEMENT |
| 65: | SECOND LED ELEMENT |
| 71: | SURFACE PARALLEL TO FRONT DIRECTION |
| 83: | BLOCK |
| 100, 150, 170: | LIQUID CRYSTAL DISPLAY |
| 151: | OPTICAL SENSOR |
| 157: | LIGHT LEAKAGE AREA |
| 171: | BLOCK |
| 181: | MOISTURE CONTENT SENSOR |
| 183: | ELECTRODE |
| 185, 185a, 185b: | CORRECTION TABLE |
| 187: | R COLOR CORRECTION SECTION |
| 189: | G COLOR CORRECTION SECTION |
| 191: | B COLOR CORRECTION SECTION |
| 193: | MOISTURE CONTENT MAP |
| 200, 250, 270: | BACKLIGHT UNIT |
| 300, 350, 370: | LIQUID CRYSTAL PANEL |
| N: | NORMAL DIRECTION |
| θ: | INCLINATION ANGLE (POLAR ANGLE) |
| φ: | ANGLE |
| T: | TEMPERATURE |

DESCRIPTION OF EMBODIMENTS

Preferred embodiments of a backlight unit and a liquid crystal display according to the invention will be described in detail with reference to the accompanying drawings.

Figure 1:
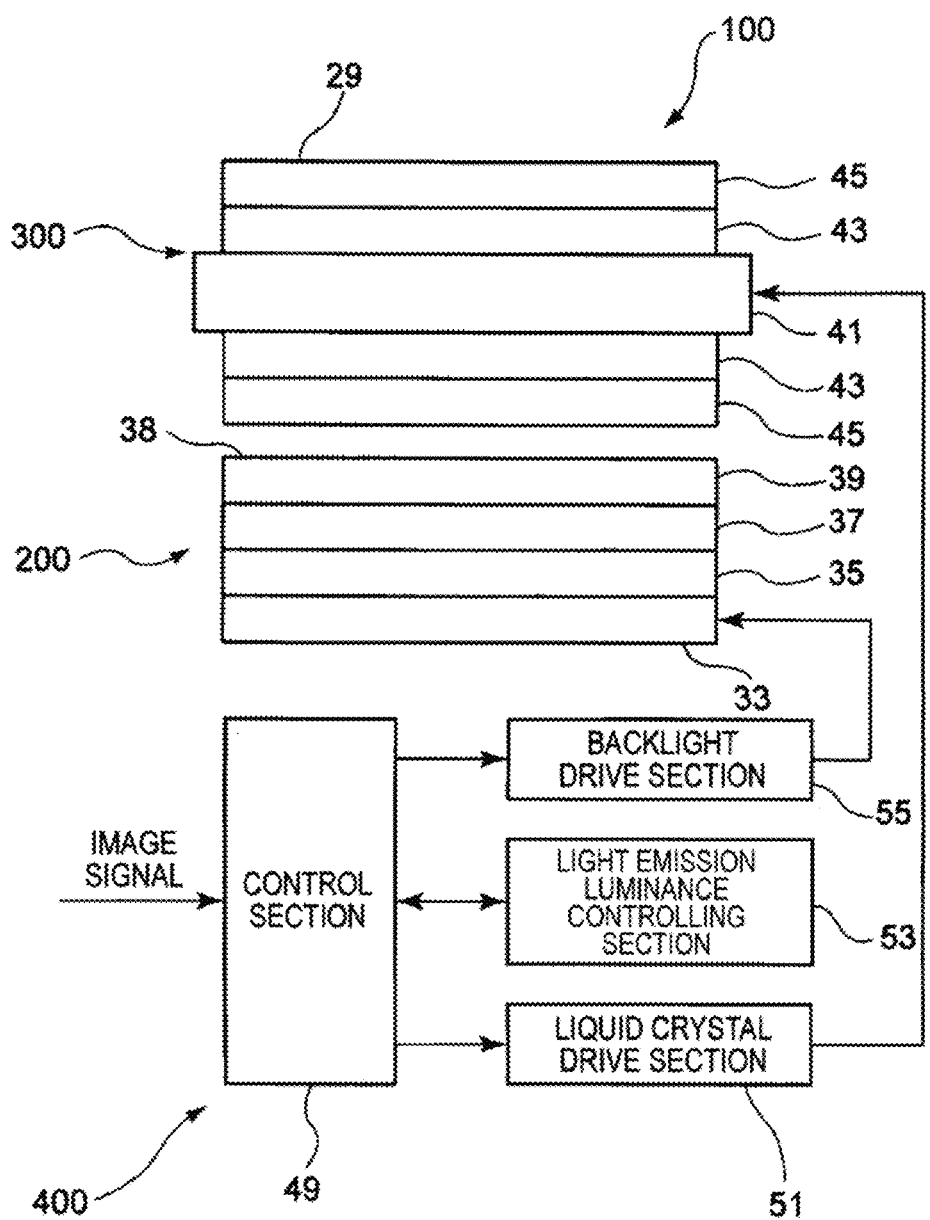
FIG. 1 is a diagram of the configuration of a liquid crystal display according to the invention.

FIG. 1 is a diagram of the configuration of a liquid crystal display according to the invention.

A liquid crystal display 100 according to the embodiment of the invention includes main components of a backlight unit 200, a liquid crystal panel 300, and a control unit 400. The backlight unit 200 has a plurality of light sources arranged below a light emission surface and uses LEDs for emitting red light, green light, and blue light of the three primary colors of light as light sources, thereby mixing red light, green light, and blue light emitted from the LEDs to generate white light. The backlight unit 200 includes a light source section 33 having red LEDs 31R (see FIG. 2), green LEDs 31G (see FIG. 2), and blue LEDs 31B (see FIG. 2) arranged alternately in the XY direction on a printed wiring board.

The light source section 33 is provided with a diffusion plate 35, a diffusion sheet 37, and a prism sheet 39 on the light emission side. Therefore, in the backlight unit 200, red light, green light, and blue light are emitted from the red LEDs 31R, the green LEDs 31G, and the blue LEDs 31B respectively included in the light source section 33, red light, green light, and blue light emitted from the LEDs 31 are naturally mixed into white light while proceeding in the direction in which the diffusion plate 35 and the diffusion sheet 37 are provided, and the light lights the liquid crystal panel 300.

In this embodiment, a TN (Twisted Nematic) liquid crystal panel is used as the liquid crystal panel 300. The liquid crystal panel 300 is provided with a liquid crystal cell substrate 41, and on the light incidence side and the light emission side of the liquid crystal cell substrate 41, a phase difference film 43 and a polarizing plate 45 are provided from the liquid crystal cell substrate 41 side. Light emitted from the prism sheet 39 of the backlight unit 200 is incident on the polarizing plate 45 on the light incidence side of the liquid crystal panel 300, then passes through the phase difference film 43 and enters the liquid crystal cell substrate 41, further passes through the phase difference film 43 and the polarizing plate 45, and is observed on a display surface 47.

The control unit 400 is provided with a control section 49 and an image (video) signal is input to the control section 49. A liquid crystal drive section 51 is connected to the control section 49 and performs drive control of the liquid crystal cell substrate 41 based on the image signal output from the control section 49. A light emission luminance controlling section 53 is connected to the control section 49 and sends a light emission luminance controlling signal of the red LEDs 31R, the green LEDs 31G, and the blue LEDs 31B described below to the control section 49. A backlight drive section 55 is connected to the control section 49 and drives the red LEDs 31R, the green LEDs 31G, and the blue LEDs 31B based on the light emission luminance controlling signal sent from the control section 49.

Figure 2:
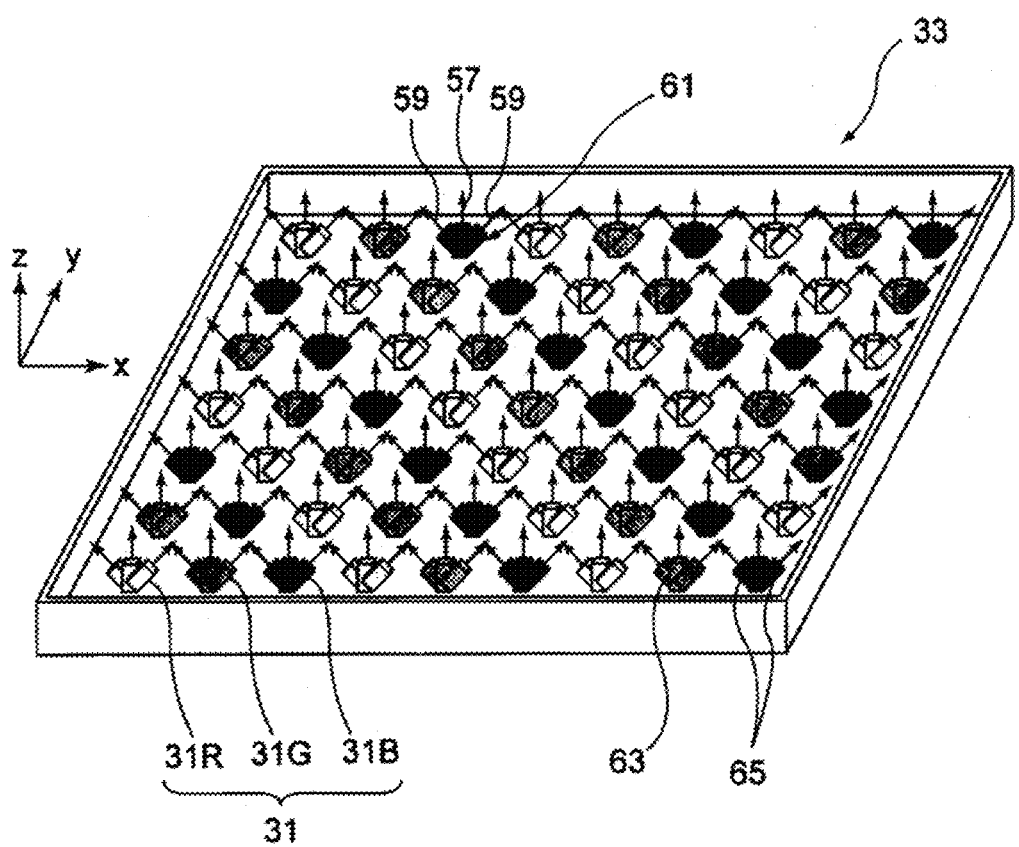
FIG. 2 is a conceptual perspective view of a light source section shown in FIG. 1.

FIG. 2 is a conceptual perspective view of the light source section shown in FIG. 1.

The backlight unit 200 includes a light emission spectrum controlling unit for separately controlling light emission spectra in a front direction 57 which becomes a normal direction to the light emission surface 38 and a slanting direction 59 inclined at a predetermined angle from the normal direction. That is, the light emission spectra in the front direction 57 and the slanting direction 59 can be controlled separately by the control section 49 and the light emission luminance controlling section 53, directivity and the light emission intensity can be controlled separately for each of R, G, and B colors, and chromaticity (spectrum) can be adjusted in the front direction 57 and the slanting direction 59. This adjustment may be made to either the front direction 57 or the slanting direction 59 or may be made to both of the front direction 57 and the slanting direction 59. Thus, in this embodiment, the control section 49 and the light emission luminance controlling section 53 make up the light emission spectrum controlling unit.

In the backlight unit 200, a plurality of light sources are a plurality of LED elements different in light emission color and each includes a first LED element 63 with the front direction 57 as the optical axis of emission light and second LED elements 65 with the slanting direction 59 as the optical axis of emission light for each light emission color. The light emission spectrum controlling unit makes it possible to change the light emission intensity for each second LED element 65 for each light emission color. That is, the light emission intensity of the LED light source toward the slanting direction 59 can be adjusted for each light emission color relative to the LED light source toward the front direction 57 and the chromaticity (spectrum) in the front direction 57 and the slanting direction 59 can be adjusted relatively.

Multi-directional irradiation units 61 each having the first LED element 63 and the second LED elements 65 as a single body, for example, are disposed in a lattice for each light emission color as shown in FIG. 2. Chromaticity (spectrum) in the front direction 57 and the slanting direction 59 can be adjusted by each of the multi-directional irradiation units 61, a uniform light quantity distribution can be realized on the entire light emission surface. In addition, the multi-directional irradiation units 61 may be arranged as a random arrangement or staggered arrangement. In the random arrangement, periodical luminance unevenness is decreased and in the staggered arrangement, the number of the multi-directional irradiation units arranged per unit area under the same illuminance can be reduced. The multi-directional irradiation units 61 may be arranged like a concentric circle. Further, the unit may be disassembled and the LED light sources of each color may be arranged as a dispersal arrangement as described later.

A specific configuration example of the multi-directional irradiation unit will be described.

Figure 3:
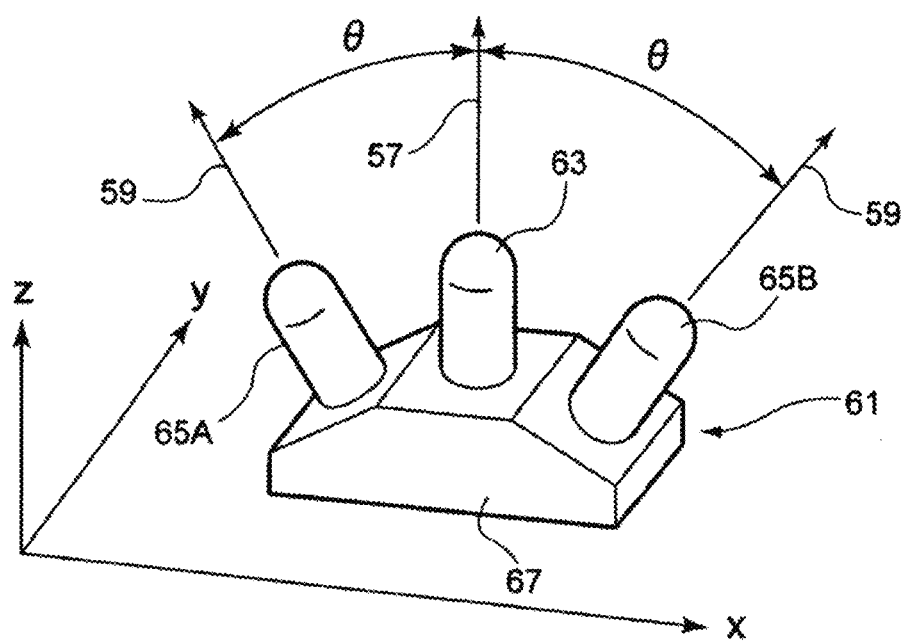
FIG. 3 is a perspective view as an example of a multi-directional irradiation unit shown in FIG. 2.

FIG. 3 is a perspective view as an example of the multi-directional irradiation unit shown in FIG. 2.

The first LED element 63 is implemented as a shell-shaped LED element arranged with the optical axis of emission light (main axis) toward the front direction 57. The second LED elements 65A and 65B are implemented as two shell-shaped LED elements each with the optical axis of emission light (main axis) controlled in a direction of a predetermined inclination angle θ from the front direction 57 in a plane parallel to the front direction 57 (zx plane). The shell-shaped LED element has a lens in an element tip part and emits light with directivity as the tip direction of the shell shape becomes high luminance. Thus, when viewed from right in front of the LED element emitting light, very bright light is emitted, and light is hardly emitted in a lateral direction.

In this embodiment, the multi-directional irradiation units 61 each having LED elements of the first LED element 63 and the second LED elements 65 as a single body are dispersed below the light emission surface. In the multi-directional irradiation unit 61, the two second LED elements 65A and 65B can be arranged in the same plane at the predetermined inclination angle θ with the optical axis of emission light in the front direction 57 between, and adjustment of color allocation symmetrical on both end sides with the front direction 57 as the center is made possible. Accordingly, for example, chromaticity (spectrum) can be controlled in a direction of any desired inclination angle θ with the front direction 57 as the center symmetrically in the zx plane, and adjustment of color balance is facilitated.

With the multi-directional irradiation unit 61 as a single body, power supply to the first LED element 63 toward the front direction 57 and a pair of second LED elements 65 and 65 toward the slanting direction 59 can be collected and the wiring structure can be made compact and simplified.

Preferably, the inclination face azimuths of the second LED elements 65A, 65B in the multi-directional irradiation units 61 are made uniform to one direction. That is, the direction in which the inclination angle θ opens may be uniform in all units. The inclination angle θ need not necessarily be constant at all positions; if the angles are dispersed in a predetermined angle range, the luminance distribution is averaged and unevenness becomes unlikely to occur.

To incline the second LED elements 65A and 65B, the light sources are attached to a base 67 having inclination faces as shown in the drawing. In addition, a printed board may be inclined; the thickness of a copper film of the printed board may be inclined by etching or the shape of the board may be changed.

The second LED elements 65A and 65B are two light sources toward the slanting direction 59 as the basic configuration, but may be one light source. In this case, although the viewing angle is limited, the display screen of the liquid crystal display is often observed in an almost determined direction and the decreasing effect of luminance change when the observer shakes his or her head from side to side on the screen center side can be provided simply by inclining the optical axis to the screen center side. If the observer deviates largely from the usual state in such a manner that he or she sees the screen from the left or the right deviating largely from the screen center, light sources toward two directions are required.

The light emission luminance distribution of the multi-directional irradiation unit will be described.

Figure 4:
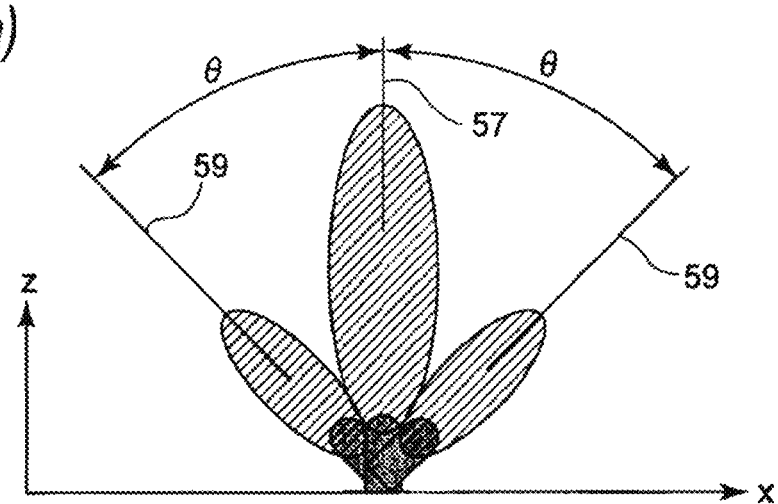
FIG. 4 (*a*) is an explanatory view showing an irradiation state of the multi-directional irradiation unit shown in FIG. 3 relative to one color and (b) is an explanatory view showing a light emission luminance distribution of the multi-directional irradiation unit.
Figure 4:
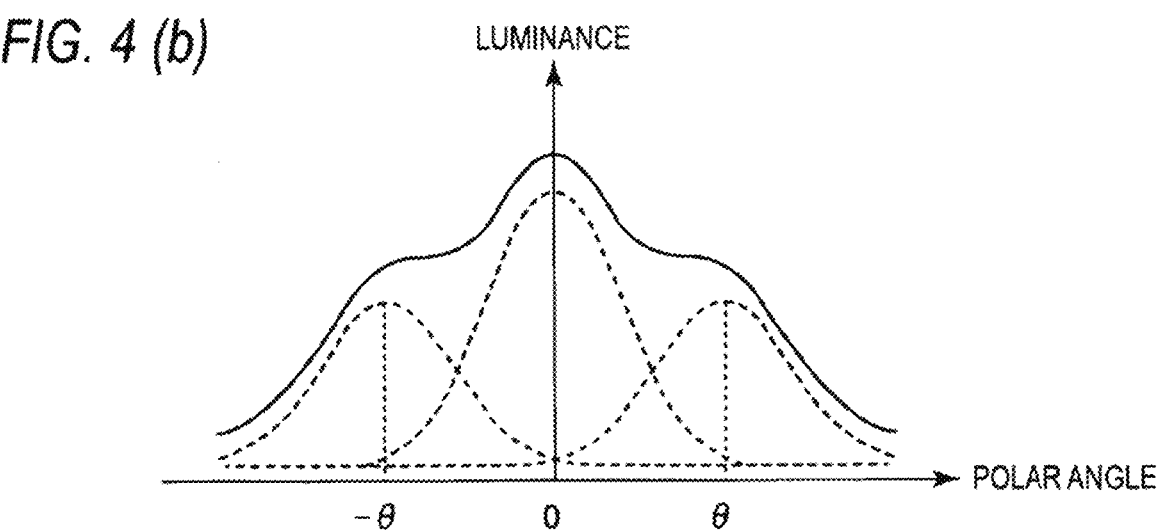

FIG. 4 (a) is an explanatory view showing the irradiation state of the multi-directional irradiation unit shown in FIG. 3 relative to one color and (b) is an explanatory view showing the light emission luminance distribution of the multi-directional irradiation unit.

In the multi-directional irradiation unit 61, the second LED elements 65A and 65B are each inclined at the predetermined angle θ with respect to the first LED element 63 and the first LED element 63 is caused to emit light with luminance required for usual image display in the front direction 57 (namely, the direction parallel to the Z axis) as shown in FIG. 4 (a). Each of the second LED elements 65A and 65B is caused to emit light with luminance of about half the luminance of the first LED element 63. In this case, the light emission luminance distribution synthesized in the multi-directional irradiation unit 61 in a single color becomes as indicated by the solid line in FIG. 4 (b). That is, the luminance reaches the maximum at a polar angle 0° and also decreases with an increase or a decrease in the polar angle as the luminance distribution.

Next, a state in which R, G, and B colors are mixed for each light source by the multi-directional irradiation units will be described.

Figure 5:
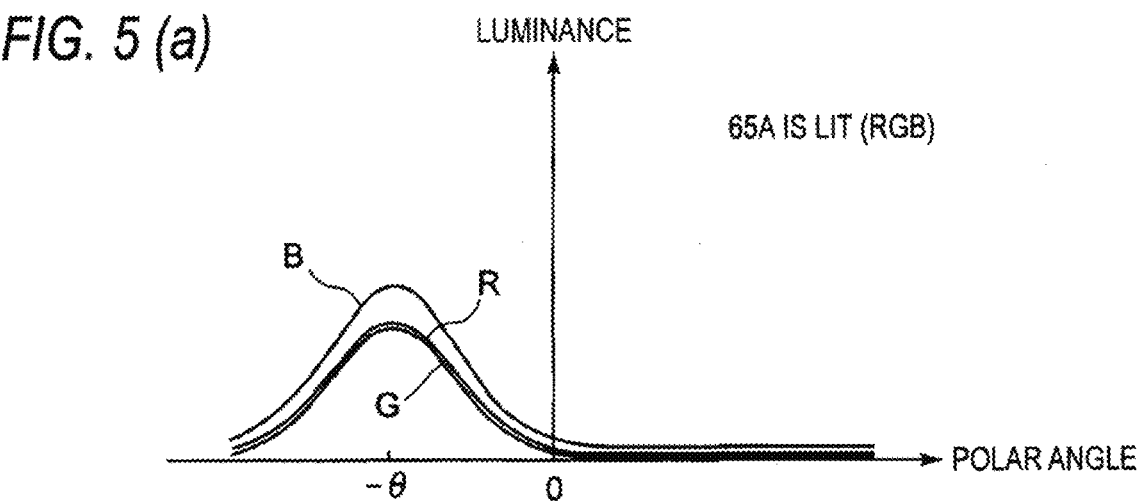
FIGS. 5 (*a*) to (*c*) are graphs showing the relationship between luminance and a polar angle when left, center, and right light sources are lit for each color.
Figure 5:
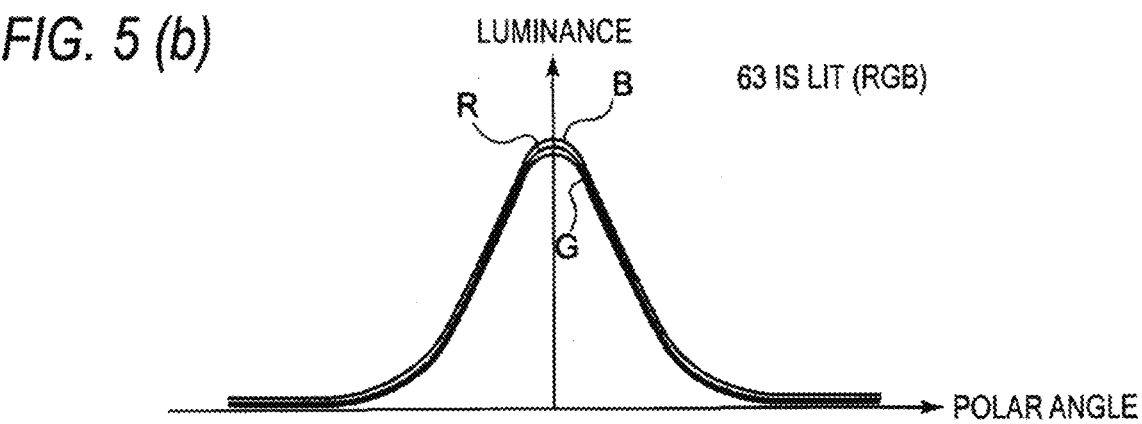
Figure 5:
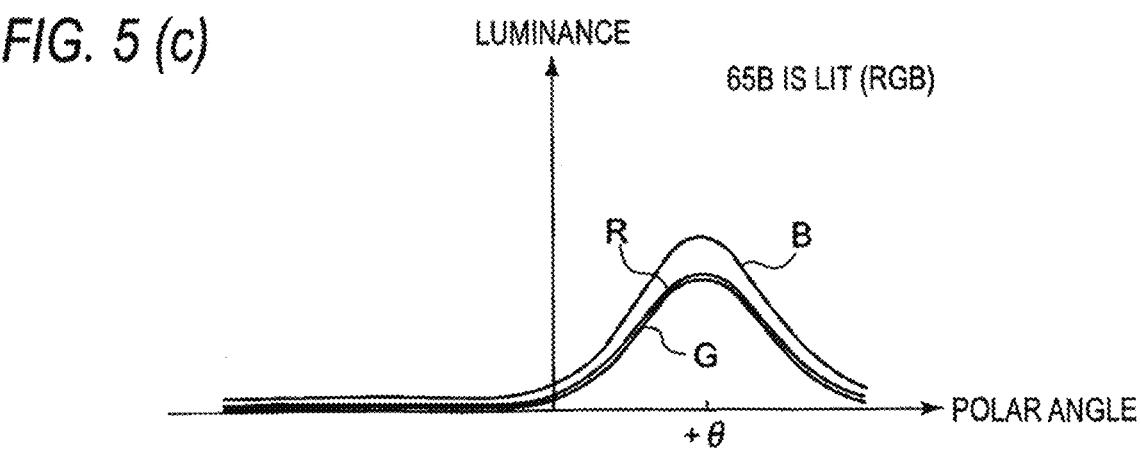

FIGS. 5 (a) to (c) are graphs showing the relationship between luminance and a polar angle when the second LED element 65A, the first LED element 63, and the second LED element 65B are lit for each color.

On the TN liquid crystal panel 300, yellow tint with polar angle inclination in the horizontal direction caused by an optically-compensatory film is observed at the white display time. In this case, the tint can be eliminated by adjusting the light amounts of R, G, and B colors emitted in the slanting direction as shown in FIG. 5.

Specifically, in the multi-directional irradiation unit 61 of each color, the light emission luminance controlling section 53 controls light emission luminance of red R and green G about 80% lower than light emission luminance of blue (B) by lighting the second LED element 65A (left) and the second LED element 65B (right) as shown in FIGS. 5 (*a*) and (*c*). Meanwhile, as the first LED element 63 (center) is lit, light emission luminance of each of the R, G, and B colors is controlled to 100%, as shown in FIG. 5 (*b*).

The light emission luminance ratio among the first LED element 63 and the second LED elements 65A and 65B in each color becomes as listed in Table 1 given below.

TABLE 1

| | Light Emission Intensity Ratio | | |
|---|---|---|---|
| | $-\theta$ side | Front | $+\theta$ side |
| R | 80% | 100% | 80% |
| G | 80% | 100% | 80% |
| B | 100% | 100% | 100% |

The light emission luminance ratio can be adjusted according to any desired parameter of control of the applied current value (constant voltage drive), the applied voltage value (low current drive) to the light source section 33, and the like.

Figure 6:
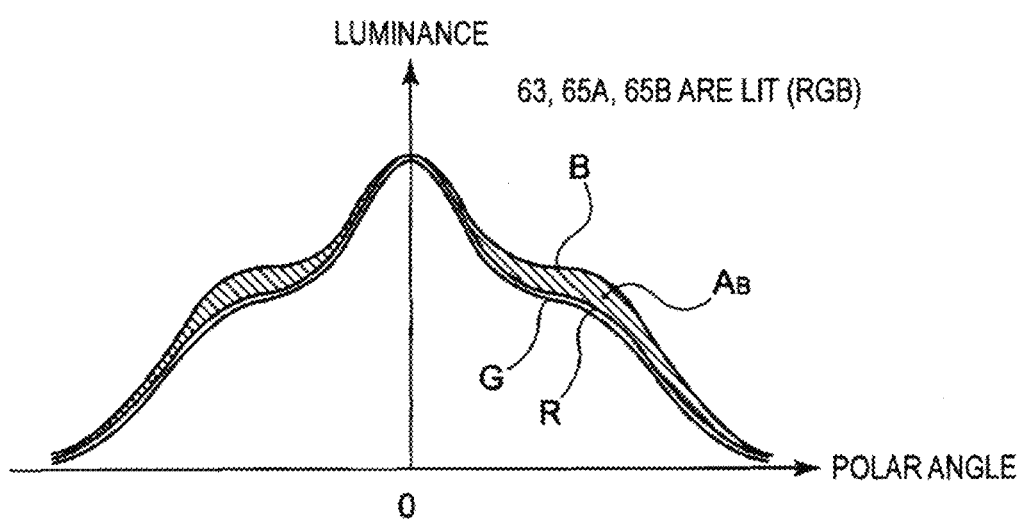
FIG. 6 is a graph showing a composite luminance distribution of three colors.

If the first LED element 63 and the second LED elements 65A and 65B are lit at the same time under the condition of the light emission luminance ratio described above, light emission luminance profiles of the three colors are combined to obtain a composite luminance distribution shown in FIG. 6 according to the light emission luminance ratio among the first LED element 63 and the second LED elements 65A and 65B shown in FIG. 5.

Therefore, as the whole of the backlight unit 200, the first LED element 63 is lit to produce each color 100% for emitting white light; on the other hand, in the component in the slanting direction produced by the second LED elements 65A and 65B, luminance of the B color is higher than the R, G color as much as area $A_B$ and consequently the light emitted in the slanting direction 59 becomes irradiation light with strong blue color. That is, in the TN liquid crystal panel, in observation from the slanting direction, yellow tint appears because of the presence of the optically-compensatory film and this tint change is improved by emitting blue tint color.

The improvement of the tint change described above will be described with a schematic diagram.

FIG. 7 (*a*) is a graph showing a luminance distribution when white display is performed on the liquid crystal panel for R, G, and B colors, (*b*) is a graph showing the light transmission characteristic of the liquid crystal panel, and (*c*) is a graph showing a backlight luminance distribution.

As shown in FIG. 7 (*b*), the TN liquid crystal panel 300 has a light transmission characteristic that the transmittance of the B color in the slanting direction 59 (in the vicinity of polar angle $\theta$) becomes lower than that of the R, G color because of the presence of the optically-compensatory film. Thus, the light source section 33 of the backlight unit 200 emits irradiation light with the B color component enhanced in the slanting direction 59 as shown in FIG. 7 (*c*). Accordingly, as shown in FIG. 7 (*a*), it is observed that white light with the yellow tint from the slanting direction 59 is eliminated.

Thus, in the liquid crystal display 100 of this embodiment, for the color component insufficient in the slanting direction, for example, in the proper light transmission characteristic caused by the optically-compensatory film of the liquid crystal panel 300, the light emission spectrum in the slanting direction is controlled separately for each of the R, G, and B colors, so color allocation is adjusted. Therefore, the viewing angle dependency of tint of a display image is improved and consequently if tint occurs according to the viewing angle characteristic of the liquid crystal panel, the tint change can be canceled to produce high-quality image display.

To adjust the light emission spectrum, the second LED elements 65A and 65B can be controlled separately, so that various luminance distribution patterns can be formed finely.

Figure 8:
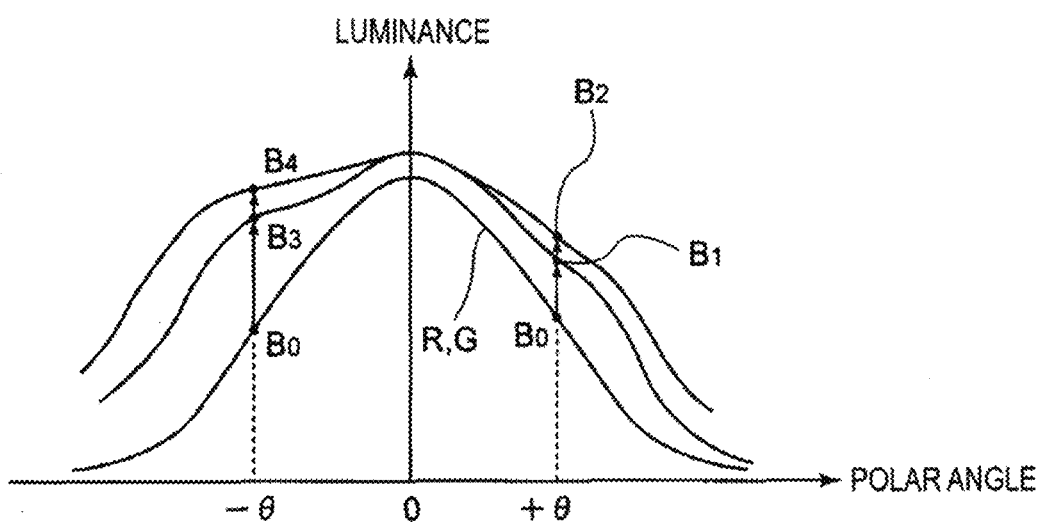
FIG. 8 is a graph of a luminance distribution showing an example of light emission control asymmetrical with a front direction as a center.

FIG. 8 is a graph of a luminance distribution showing an example of light emission control asymmetrical with the front direction as the center.

In each color (in the example shown in the drawing, particularly B color), the control intensities of the first LED element 63 and the second LED elements 65A and 65B of the multi-directional irradiation unit 61 are controlled in the light emission luminance controlling section 53, so $B_0$ is adjusted to $B_1$ or $B_2$ in the slanting direction 59 at polar angle $+\theta$ and $B_0$ is adjusted to $B_3$ or $B_4$ in the slanting direction 59 at polar angle $-\theta$ and luminance can be adjusted arbitrarily in an asymmetrical distribution with respect to the polar angle.

Therefore, the backlight unit 200 includes a light emission spectrum controlling unit for separately controlling light emission spectra in a front direction 57 which becomes a normal direction to the light emission surface and a slanting direction 59 inclined at a predetermined angle from the normal direction, so that directivity and the light emission intensity are controlled separately for each of the R, G, and B colors, the chromaticity (spectrum) is varied in the front direction 57 and the slanting direction 59, and the viewing angle dependency of tint of a display image can be improved. This asymmetrical light emission distribution is preferably used particularly to change the light emission state according to the place in the display screen and subtle tint change can be more reliably eliminated.

Thus, the liquid crystal display 100 according to the invention includes the backlight unit 200, the liquid crystal panel 300 arranged facing the backlight unit 200, and the control unit 400, so that for the color component insufficient in the slanting direction 59 in the proper light transmission characteristic caused by the optically-compensatory film of the liquid crystal panel, the light emission spectrum in the slanting direction 59 is controlled separately for each of the R, G, and B colors, so the viewing angle dependency of tint of a display image can be improved. Consequently, a high-quality display image with no tint can be obtained when viewed from the slanting direction 59.

A modification where the light sources are dispersed according to the light emission direction in place of the backlight unit described above will be described.

Figure 9:
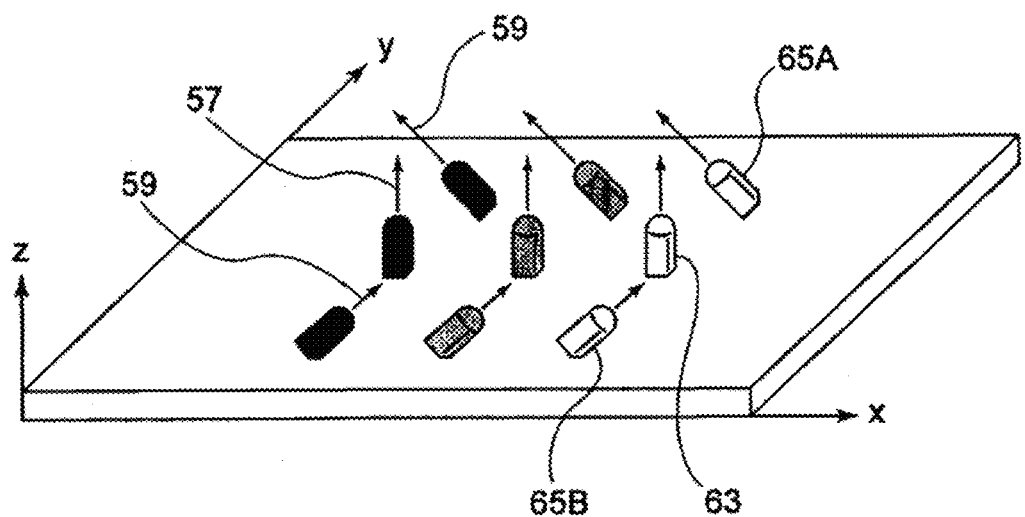
FIG. 9 is a perspective view of a modification where LED elements of a first LED element and a second LED element are arranged separately.

FIG. 9 is a perspective view of a modification where the LED elements of the first and second LED elements are separately arranged. The first LED element 63 and the second LED elements 65A and 65B can also be disposed separately rather than in the multi-directional irradiation unit 61 as a single body. According to the configuration, the light sources are dispersed finely, so that the distance between the light sources is shortened and more even illumination light can be provided.

In the configurations of the backlight unit described above, the second LED elements 65A and 65B are arranged having an open angle of the predetermined inclination angle $\theta$ from the front direction and this is a preferred configuration particularly for the TN liquid crystal.

Figure 10:
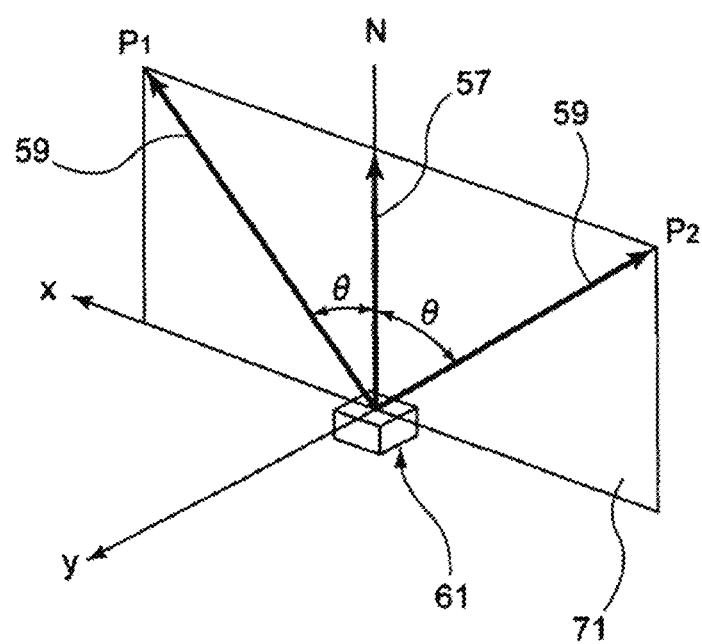
FIG. 10 is an explanatory view showing an optical axis in a slanting direction used with TN liquid crystal.

FIG. 10 is a schematic representation to show an optical axis in the slanting direction used with the TN liquid crystal.

For the TN liquid crystal panel 300, it is known that tint change easily occurs in a direction inclined 45° with respect to a normal direction N as shown in FIG. 10. Thus, the inclination angle θ of each of the second LED elements 65A and 65B is controlled to 45° (or ranging from 40° to 50°), so the viewing angle dependency of tint of a display image caused by the optically-compensatory film of the TN liquid crystal panel 300 can be improved efficiently.

That is, the multi-directional irradiation unit may be configured so as to contain at least two LED light sources with the second LED elements 65A and 65B having the optical axes of emission light controlled in directions P1 and P2 substantially equal in the inclination angle θ with the front direction 57 as the center in a plane 71 parallel to the front direction 57 (normal direction N). Accordingly, a phenomenon in which yellow tint occurs on both end sides in the horizontal direction of the screen at the white display time and a phenomenon in which blue tint occurs in the upper direction of the screen at the black display time, caused by the optically-compensatory film of the TN liquid crystal can be eliminated.

Next, a modification where the number of light emission directions in the slanting direction is increased will be described.

Figure 11:
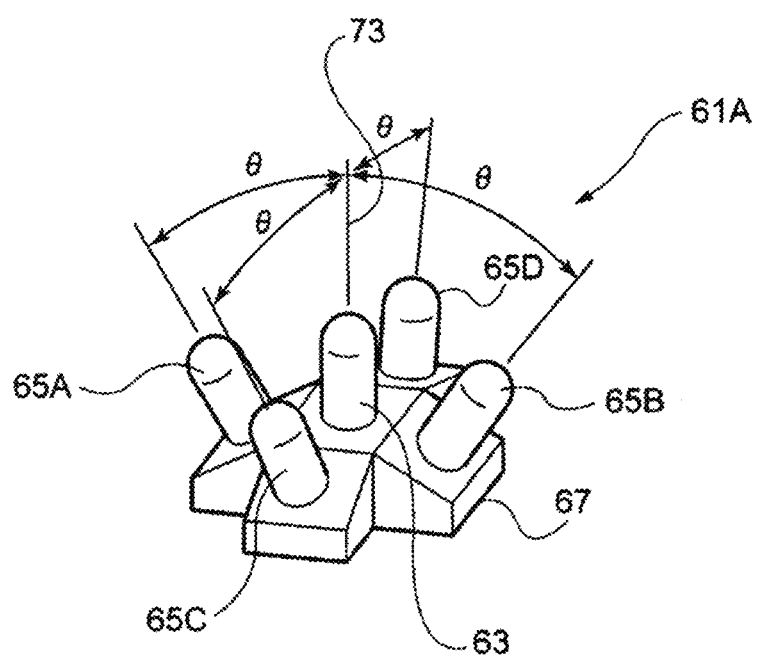
FIG. 11 is a perspective view of a modification where LED elements are arranged in an orthogonal direction.

FIG. 11 is a perspective view of a modification where LED elements are arranged in an orthogonal direction.

In the configuration example of the multi-directional irradiation unit shown in FIG. 3 described above, the second LED elements 65A and 65B are inclined in one plane 71 parallel to the front direction 57 (see FIG. 10) relative to the first LED element 63. In addition, a multi-directional irradiation unit 61A shown in FIG. 11 includes five LED elements as a single body made up of a first LED element 63 having a cross line of two planes orthogonal to each other as an optical axis 73 and a pair of second LED elements 65A and 65B and a pair of second LED elements 65C and 65D inclined at an inclination angle θ in their respective orthogonal planes with the first LED element 63 as the center. The multi-directional irradiation unit 61A is applied to the backlight unit 200, so tint change for the viewing angle difference in the vertical direction of the display screen can be improved in addition to tint change for the viewing angle difference in the horizontal direction of the display screen; higher-quality image display is made possible.

The types of LED elements will be described.

In the example described above, the shell-shaped LED elements are used, but the invention is not limited to the shell-shaped LED elements and can also be applied to any other type of LED element. The types of LED elements include not only the shell shape, but also a hat shape with a small lens part, a type with a lead of a recess or the like provided by cutting the lens tip portion, a chip-shape LED element capable of providing high luminance, and the like. Any type can be used as the LED light source of the invention.

Figure 12:
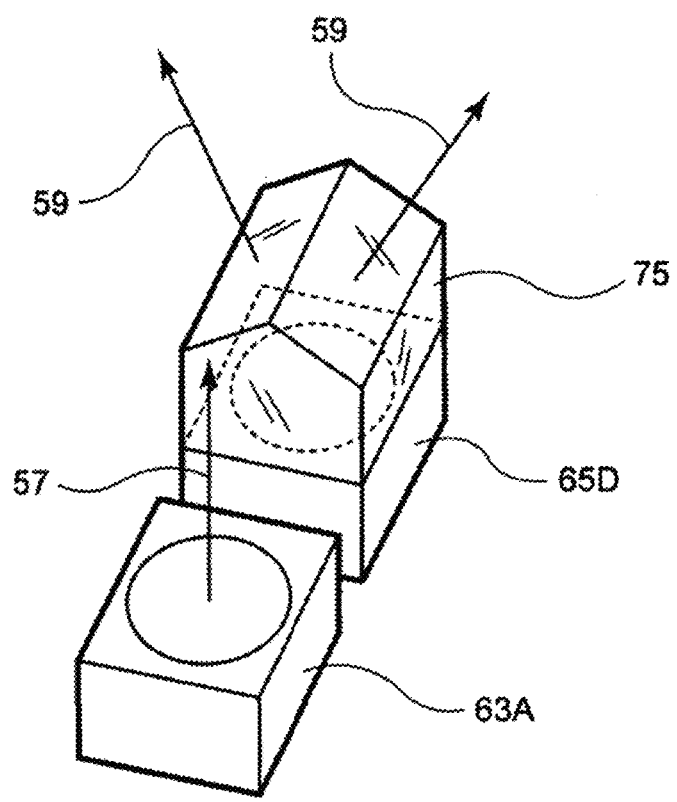
FIG. 12 is a perspective view showing the configuration in which a prism is placed on the light emission side of an LED element in a slanting direction.

As the LED element for emitting light in the light direction, a prism 75 for distributing light into two directions may be put on the light emission side of one LED element as shown in a perspective view of FIG. 12 in addition to the use of two LED elements. In this case, the number of the LED elements can be decreased and the prism needs only to be arranged in controlling in the light emission direction and the assembling step can be simplified. In the example shown in the drawing, the LED element is a chip-shaped LED element, but the invention is not limited thereto.

Next, the configuration wherein the liquid crystal panel is a VA (Vertically Aligned) liquid crystal panel will be described.

Figure 13:
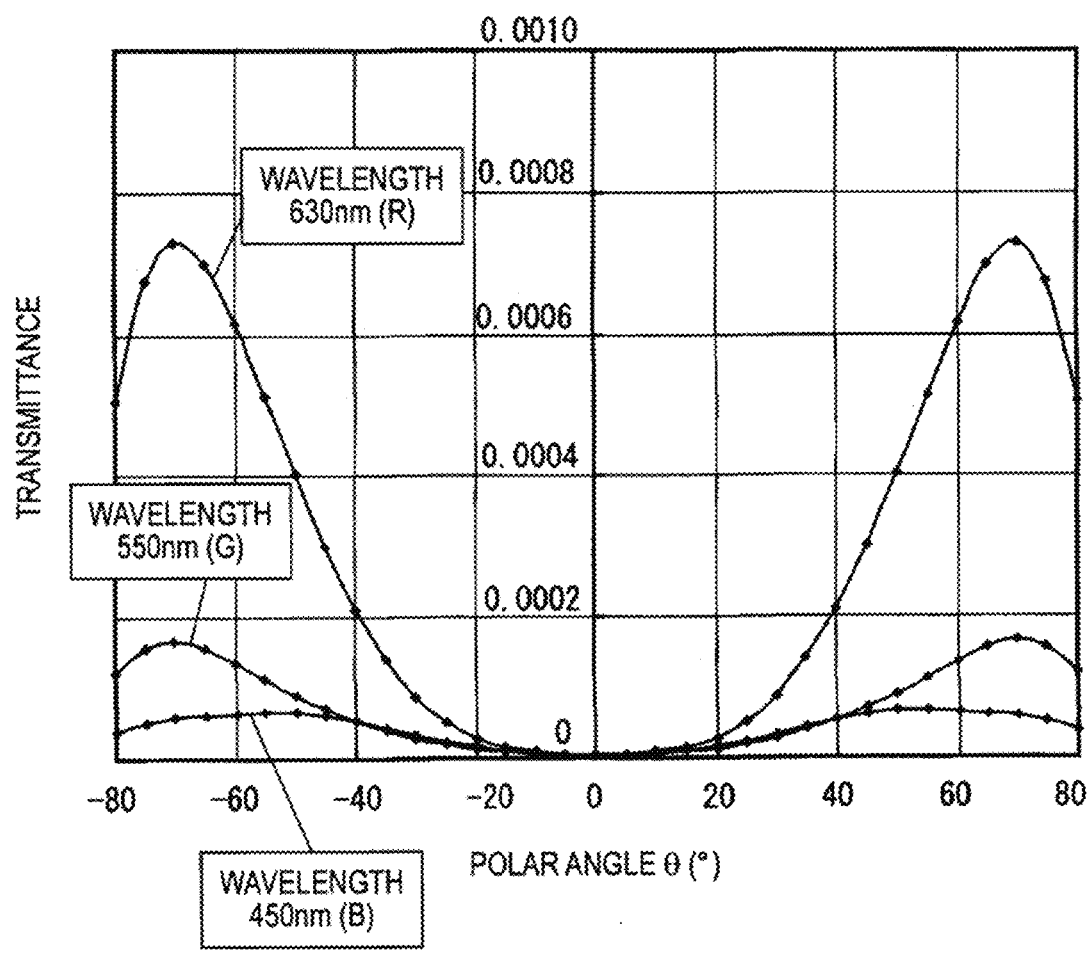
FIG. 13 is a graph showing the relationship between a light transmission characteristic and a polar angle of a VA liquid crystal panel.
Figure 14:
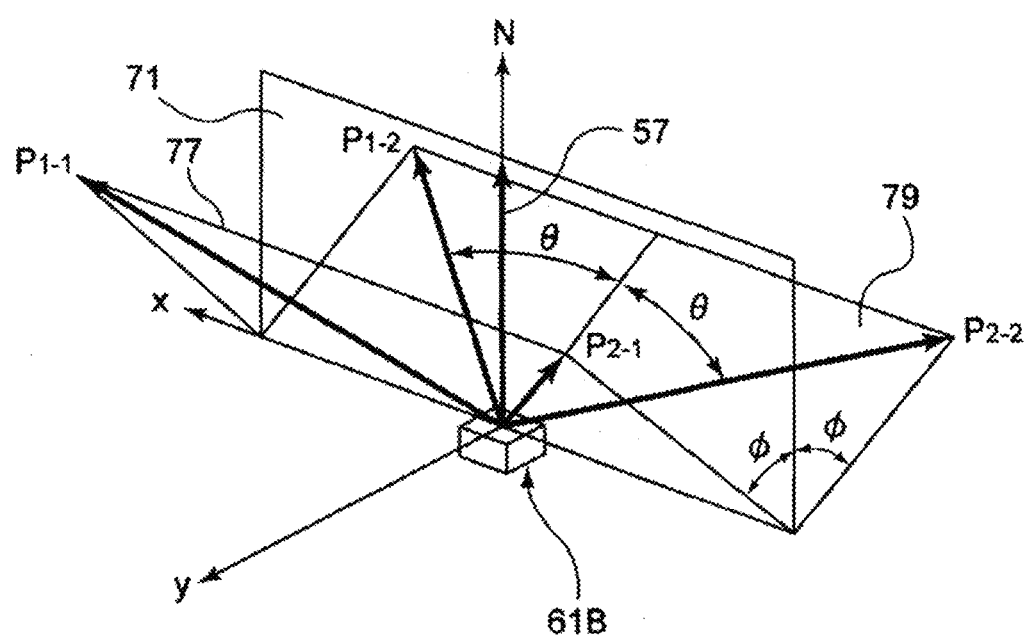
FIG. 14 is an explanatory view showing an optical axis of a multi-directional irradiation unit used with VA liquid crystal.

FIG. 13 is a graph to show the relationship of a light transmission characteristic with the polar angle of a VA liquid crystal panel, and FIG. 14 is a perspective view to show optical axes of a multi-directional irradiation unit used with VA liquid crystal.

The VA liquid crystal panel has different transmission characteristics in R, G, and B colors relative to the polar axis, caused by an optically-compensatory film as shown in FIG. 13. Thus, a multi-directional irradiation unit 61B used with the VA liquid crystal panel has as optical axes of emission light, a total of four directions of second LED elements provided by inclining two directions controlled to directions substantially equal in the inclination angle θ with the front direction 57 as the center in a first plane 71 parallel to the front direction 57 at an angle φ substantially equal in a direction orthogonal to the first plane 71 with the first plane 71 as the center as shown in FIG. 14.

That is, as the second LED elements, at least four directions with the optical axes of emission light controlled in directions substantially equal in the inclination angle θ in inclination planes 77 and 79 inclined at the angle φ with the plane 71 parallel to the front direction 57 (normal direction N) between ($P_{1-1}$, $P_{1-2}$, $P_{2-1}$, and $P_{2-2}$) may be controlled as light emission directions. Accordingly, a phenomenon in which red tint (purplish red) occurs in the slanting direction at the black display time and a phenomenon in which blue tint occurs, observed in the VA liquid crystal can be eliminated.

Figure 15:
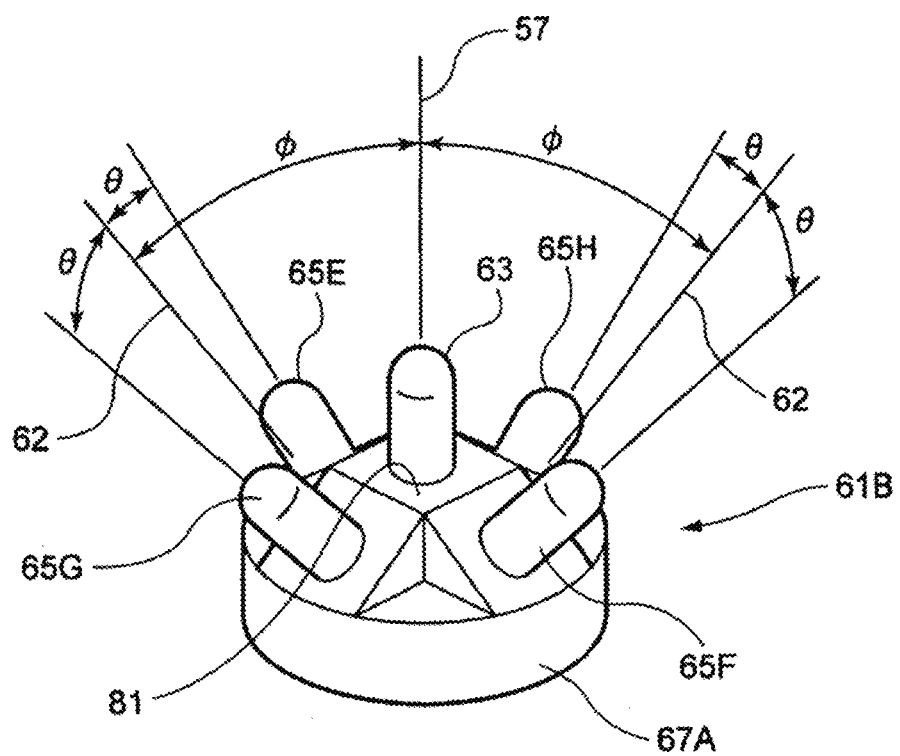
FIG. 15 is a perspective view showing a specific configuration example of a multi-directional irradiation unit for emitting light in a total of five directions of four slanting directions and a front direction.

FIG. 15 shows a specific configuration example of a multi-directional irradiation unit for emitting light in a total of five directions of the four slating directions described above and the front direction.

The multi-directional irradiation unit 61B used with the VA liquid crystal panel includes a first LED element 63 disposed on a top face 81 of a disk-like base 67A and a total of four second LED elements 65E, 65F, 65G, and 65H with the optical axes of emission light controlled in directions substantially equal in the inclination angle θ in a direction orthogonal to the inclination direction of the angle φ from two virtual lines 62 inclined at the angle φ in the same plane from the front direction 57.

Next, a control method of the backlight will be described.

If a white bright portion and a dark portion, such as a shade under a tree, or the like, are included on a screen as display content of the display screen, control is performed so that the bright portion and the dark portion become different in background luminance. That is, for the TN liquid crystal panel, yellow tint occurs in the bright portion because of the presence of the optically-compensatory film when the screen is viewed from the slanting direction 59, and thus slanting illumination light with blue tint is produced. That is, although the color in the front direction 57 may be white, the color balance is changed only in the slanting direction 59. On the other hand, blue tint or red tint may occur in the dark portion and thus in this portion, red and green are enhanced in lighting, so blue tint is canceled. To cancel red tint, blue and green may be enhanced in lighting. This characteristic can also be controlled to be monochrome; in the most practical use, the backlight unit 200 is controlled so as to perform correction according to luminance because such a characteristic also exists in halftone.

For the backlight unit 200, the light emission surface may be divided into a plurality of blocks and light emission control may be performed for each block.

Figure 16:
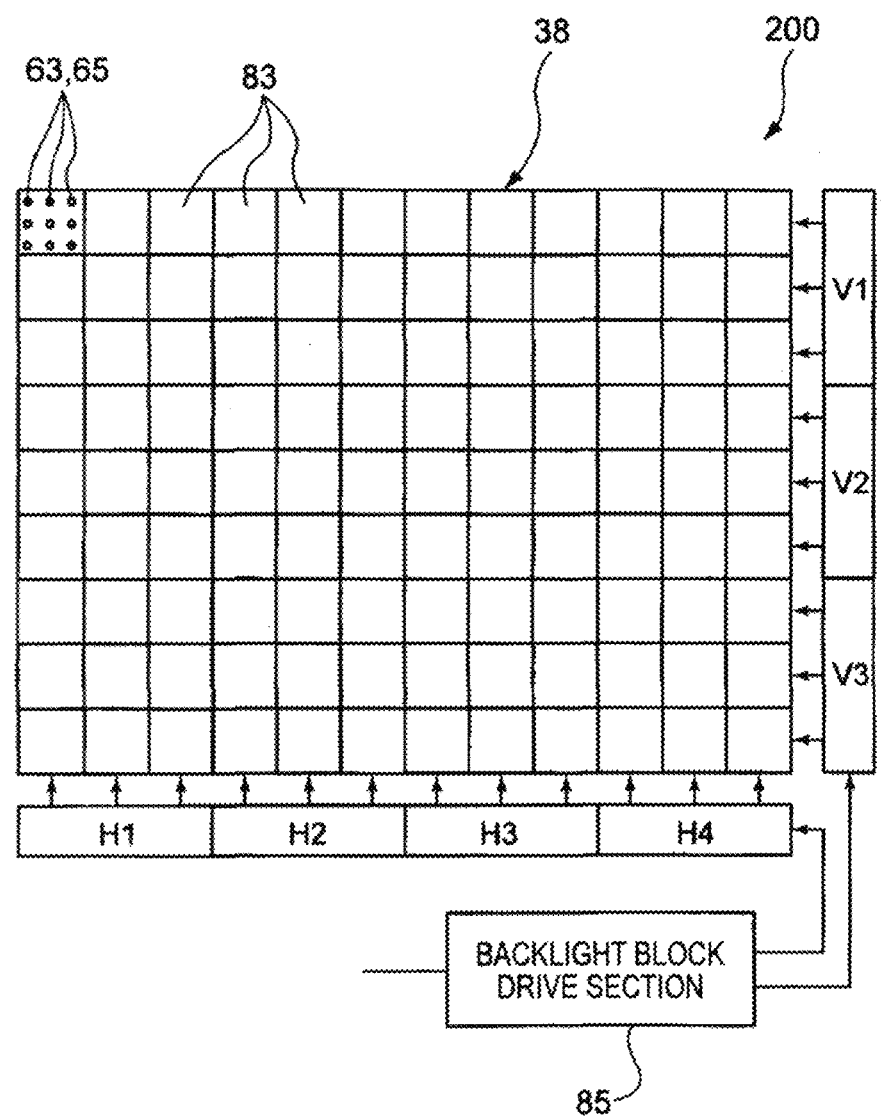
FIG. 16 is a diagram showing the configuration for performing light emission control of a light emission surface for each block.

FIG. 16 is a diagram showing the configuration for performing light emission control of the light emission surface for each block.

For the backlight unit 200, luminance is changed for each pixel (or for each block), so that finer control is made possible. That is, the light emission surface 38 of the backlight unit 200 is divided into blocks 83 and the light emission luminance controlling section 53 of the light emission spectrum controlling unit (see FIG. 1) controls the light emission intensity of the first and second LED elements 63 and 65 contained in each block 83 separately for each block 83. A backlight block drive section 85 performs drive control of vertical drive control sections $V_1$ to $V_3$ and horizontal drive control sections $H_1$ to $H_4$ each for driving a predetermined number of blocks 83. Such a configuration makes it possible to vary the light emission spectrum characteristic according to each place of the light emission surface 38. Therefore, the place where tinting is noticeable in the light emission surface can be selectively strongly corrected.

Thus, in the backlight unit 200 making it possible to control the light emission spectrum in the block 83 units, when tint varies from one place of the light emission surface 38 to another, the tint can be controlled in the block units according to the variation, fine control is made possible and the display image quality can be improved as compared with the case where the whole screen is uniformly processed. To display an image, the blocks of the backlight unit 200 can be properly controlled while they are synchronized with each other according to information of the image color, luminance, and the like, changing in time sequence.

Next, the configuration for correcting tint change using the optically-compensatory film of the liquid crystal display panel will be described.

Figure 17:
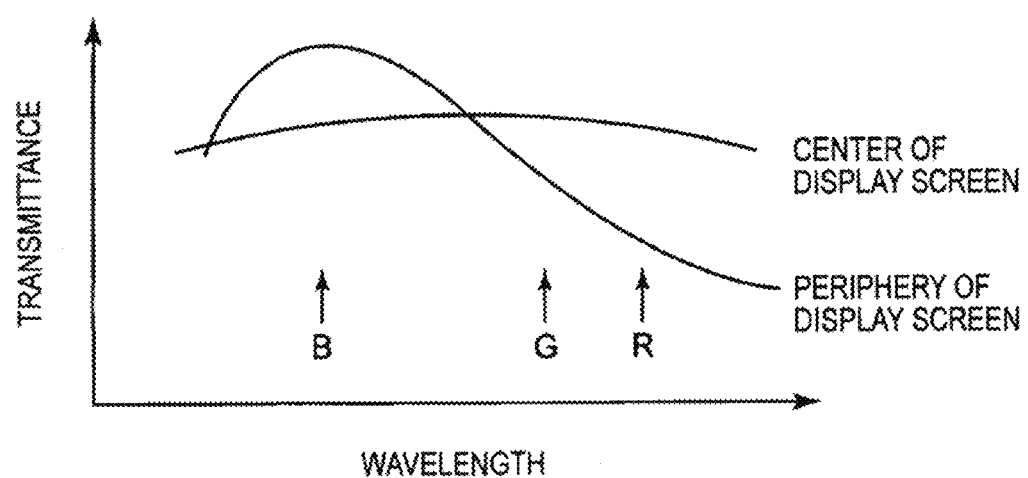
FIG. 17 is a graph showing spectral transmittance of an optically-compensatory film.

FIG. 17 is a graph to show the spectral transmittance of the optically-compensatory film.

In the foregoing embodiment, the configuration example including the multi-directional irradiation unit 61 and the light emission luminance controlling section 53 as the light emission spectrum controlling unit for separately controlling the light emission spectra in the front direction 57 and the slanting direction 59 has been described; as the light emission spectrum controlling unit, in addition, the optically-compensatory film disposed on the display surface of the liquid crystal display panel can also be used or can be used in combination with the controlling unit. In this case, the optically-compensatory film has wavelength dependency and has transmittance varying according to the position of the light emission surface (screen). That is, a plurality of areas corresponding to substantially one pixel including RGB are defined and transmittance in the areas is controlled so that the transmittance of RGB is made substantially equal at the center of the display screen and the transmittance of B is controlled high and the transmittance of G, R is controlled low on the periphery of the display screen as shown in FIG. 17, for example, for the TN liquid crystal panel. Also according to this, directivity and light emission intensity are controlled separately for each of the R, G, and B colors, chromaticity (spectrum) is varied in the front direction 57 and the slanting direction 59, and the viewing angle dependency of tint of the display screen can be improved.

The optically-compensatory film can use a film provided by adjusting the wavelength dispersion characteristic of a phase difference film or a diffusion sheet with wavelength dependency controlled intentionally.

The optically-compensatory film will be described in detail. [Re(λ), Rth(λ)]

In this specification, Re(λ) and Rth(λ) represent in-plane retardation and retardation in a thickness direction at a wavelength λ. Re(λ) is measured by light of wavelength λ nm in the film normal direction in an ellipsometer (M-150, manufactured by Nihon Bunkou (Kabu)) or KOBRA 21ADH (manufactured by Ouji Keisokukiki (Kabu)). Rth(λ) is calculated by the ellipsometer or KOBRA 21ADH based on retardation values measured in three directions of Re(λ) described above, retardation value Re (40°) measured by entering light of wavelength λ nm from a direction inclined +40° with respect to the film normal direction with an in-plane slow axis (determined by the ellipsometer or KOBRA 21 ADH) as an inclination axis (rotation axis), and retardation value Re (−40° measured by entering light of wavelength λ nm from a direction inclined −40° with respect to the film normal direction with the in-plane slow axis as the inclination axis (rotation axis), an assumed value of average refractive index, and an input film thickness value. As the assumed value of average refractive index, the values in Polymer Handbook (JOHN WILEY&SONS, INC) and various optical film catalogs can be used. Those with an unknown value of average refractive index can be measured with an Abbe refractometer. The values of the average refractive index of main optical films are illustrated below: Cellulose acylate (1.48), cycloolefin polymer (1.52), polycarbonate (1.59), polymethyl methacrylate (1.49), and polystyrene (1.59). The assumed value of average refractive index and the film thickness value are input, so the ellipsometer or KOBRA 21ADH calculates nx, ny, and nz. From the calculated nx, ny, and nz, $Nz=(nx-nz)/(nx-ny)$ is further calculated.

A retardation value with no angle specified (a retardation value other than Re (40°) or Re (−40°)) is a value measured by entering light the surface normal direction. Positive or negative of the tilting angle indicating the inclination angle relative to the film normal direction with the slow axis as an inclination axis (rotation axis) is determined so that Re (40°)>Re (−40°).

[Polymer Film]

A transparent supporter of an optical compensation sheet is made of at least one polymer film. The transparent supporter can also be formed of two or more polymer films for accomplishing optical anisotropy defined by the invention. The optical anisotropy of the transparent supporter specifically has the Re retardation value measured with light of wavelength of 632.8 nm in the range of 10 to 200 nm and the Rth retardation value measured with light of wavelength of 632.8 nm in the range of 50 to 400 nm. To use two optically anisotropic polymer films for the liquid crystal display, the Rth retardation value of one film is preferably 50 to 200 nm. To use one optically anisotropic polymer film for the liquid crystal display, the Rth retardation value of the film is preferably 70 to 400 nm.

Preferably, the average value of the slow axis angle of the polymer film is 3° or less, more preferably 2° or less, most preferably 1° or less. The direction of the average value of the slow axis angle is defined as the average direction of the slow axis. Preferably, the standard deviation of the slow axis angle is 1.5° or less, more preferably 0.8° or less, most preferably 0.4° or less. The angle of the slow axis in the polymer film plane is defined as the angle between the slow axis and a reference line where the stretching direction of the polymer film is the reference line (0°). When a roll-shaped film is stretched in the width direction, the width direction is adopted as the reference line; when a roll-shaped film is stretched in the length direction, the length direction is adopted as the reference line.

Preferably, the light transmittance of the polymer film is 80% or more. Preferably, the polymer film has a photoelastic coefficient of $60\times10^{-12}$ $m^2/N$ or less.

In a transmission liquid crystal display using the optical compensation sheet, "display unevenness shaped like a frame" may occur on the screen periphery with the passage of time after energization. This unevenness is caused by a rise in the transmittance of the screen periphery and becomes noticeable particularly at the black display time. In the transmission liquid crystal display, heat is generated from the backlight and moreover a temperature distribution occurs in the crystal liquid cell plane. Change in the optical characteristic (retardation value, angle of slow axis) of the optical compensation sheet caused by the temperature distribution is the cause of the occurrence of "display unevenness shaped like a frame". The change in the optical characteristic of the optical compensation sheet is caused by the occurrence of elastic deformation in the optical compensation sheet because expansion or shrinkage of the optical compensation sheet caused by a temperature rise is suppressed by adhesion with the liquid crystal cell or the polarizing plate.

To suppress "display unevenness shaped like a frame" occurring in the transmission liquid crystal display, a polymer film having high thermal conductivity is preferably used for the transparent supporter of the optical compensation sheet. Examples of a polymer having high thermal conductivity include a cellulose-based polymer such as cellulose acetate (thermal conductivity: 0.22 W/(m·K)), a polyester-based polymer such as polycarbonate (0.19 W/(m·K)), and a cyclic olefin polymer such as a norbornene-based polymer (0.20 W/(m·K)).

A commercially available polymer, for example, a commercially available norbornene-based polymer (Arton manufactured by JSR (Kabu); Zeonoa manufactured by Nihon Zeon (Kabu); Zeonex manufactured by Nihon Zeon (Kabu)) may be used. A polycarbonate-based copolymer is described in JP-A-10-176046 and JP-A-2001-253960.

A cellulose-based polymer is preferably used; cellulose ester is more preferably used; and lower fatty acid ester of cellulose is even more preferably used. The lower fatty acid means fatty acid with the number of carbon atoms 6 or less. Preferably, the number of carbon atoms is 2 (cellulose acetate), 3 (cellulose propionate), or 4 (cellulose butyrate). Mixed fatty acid ester such as cellulose acetate propionate or cellulose acetate butyrate may be used.

Cellulose acetate (cellulose diacetate, cellulose triacetate) is particularly preferably used. Cellulose triacetate with acetylation degree 59.0% to 61.5% is most preferably used. The acetylation degree means the bond acetic acid amount per cellulose unit mass. The acetylation degree conforms to measurement and calculation of degree of acetylation in ASTM: D-817-91 (test method of cellulose acetate or the like).

Preferably, the average viscosity degree of polymerization (DP) of the polymer is 250 or more; more preferably, 290 or more. Preferably, the polymer has a narrow molecular weight distribution of Mm/Mn (Mm is mass average molecular weight and Mn is number average molecular weight) according to gel permeation chromatography. Preferably, the specific Mm/Mn value is 1.00 to 1.70; more preferably, 1.30 to 1.65; most preferably, 1.40 to 1.60.

To adjust the retardation of a polymer film, an aromatic compound having at least two aromatic rings can be used as a retardation increasing agent.

To use a cellulose acetate film as a polymer film, the aromatic compound is used in the range of 0.01 to 20 parts by mass relative to 100 parts by mass of cellulose acetate. Preferably, the aromatic compound is used in the range of 0.05 to 15 parts by mass relative to 100 parts by mass of cellulose acetate and more preferably, the aromatic compound is used in the range of 0.1 to 10 parts by mass. Aromatic compounds of two types or more may be used in combination.

The aromatic rings of the aromatic compound include an aromatic heterocycle as well as an aromatic hydrocarbon ring.

Preferably, the molecular weight of the retardation increasing agent is 300 to 800.

The retardation increasing agent is described in JP-A-2000-111914, JP-A-2000-275434, JP-A-2001-166144, and International Patent Laid-Open No. 00/02619 pamphlet.

Preferably, the polymer film is manufactured according to a solvent cast method. In the solvent cast method, a film is manufactured using a solution (dope) with a polymer dissolved in an organic solvent. Preferably, the organic solvent contains a solvent selected from ether with the number of carbon atoms 2 to 12, ketone with the number of carbon atoms 3 to 12, ester with the number of carbon atoms 2 to 12, and halogenated hydrocarbon with the number of carbon atoms 1 to 6.

Ether, ketone, and ester may have a cyclic structure. A compound having two or more of any of functional groups of ether, ketone, and ester (namely, —O—, —CO—, and —COO—) can also be used as the organic solvent. The organic solvent may have any other functional group such as an alcoholic hydroxyl group.

Example of ether include diisopropyl ether, dimethoxymethane, dimethoxyethane, 1,4-dioxane, 1,3-dioxolane, tetrahydrofuran, anisole, and phenetole. Examples of ketone include acetone, methyl ethyl ketone, diethyl ketone, diisobutyl ketone, cyclohexanone, and methylcyclohexanone. Examples of ester include ethyl formate, propyl formate, pentyl formate, methyl acetate, ethyl acetate, and pentyl acetate. Examples of the organic solvent having two or more types of functional groups include 2-ethoxy ethyl acetate, 2-methoxy ethanol, and 2-butoxyethanol. Preferably, the number of carbon atoms of halogenated hydrocarbon is 1 or 2; most preferably, 1. Preferably, halogen of halogenated hydrocarbon is chlorine. Preferably, the percentage of replacing hydrogen of halogenated hydrocarbon with halogen is 25 to 75 mole %; more preferably, 30 to 70 mole %; even more preferably, 35 to 65 mole %; most preferably, 40 to 60 mole %. Methylene chloride is representative halogenated hydrocarbon.

Two or more types of organic solvents may be mixed for use.

A polymer solution can be prepared using a general method. The general method means treatment at a temperature of 0° C. or more (normal temperature or high temperature). The solution can be prepared using a dope preparation method and apparatus in a usual solvent cast method. In the general method, halogenated hydrocarbon (particularly, methylene chloride) is preferably used. The polymer amount is adjusted so that the polymer is contained in 10 to 40% by mass in the obtained solution. More preferably, the polymer amount is 10 to 30% by mass. Any desired additive described later may be added into the organic solvent (main solvent). The solution can be prepared by agitating the polymer and the organic solvent at the normal temperature (0° C. to 40° C.). A high-concentration solution may be agitated under pressurization and heating conditions. Specifically, the polymer and the organic solvent put in a pressurization vessel, are hermetically sealed, and are agitated while being heated at a temperature equal to or higher than the boiling point of the solvent at the normal temperature under pressurization within the range that the solvent is not boiled. Usually, the heating temperature is 40° C. or more, preferably, 60° C. to 200° C., and more preferably, 80° C. to 110° C.

The components may be roughly mixed in advance before they are entered in the vessel. They may be entered in the vessel in order. The vessel needs to be configured so that the components can be agitated. An inert gas of a nitrogen gas or the like can be poured to pressurize the vessel. A rise in the vapor pressure of the solvent by heating may be used. Alternatively, after the vessel is hermetically sealed, the components may be added under pressure.

Preferably, heating is executed from the outside of the vessel. For example, a heater of jacket type can be used. A plate heater is provided on the outside of the vessel and a liquid is circulated by piping, so the whole vessel can also be heated.

Preferably, an agitation vane is provided in the vessel and used for agitating. Preferably, the agitation vane has a length reaching the vicinity of a wall of the vessel. Preferably, a scraper vane is provided at the tail end of the agitation vane to renew the liquid film of the wall of the vessel.

Measuring instruments of a pressure gauge, a thermometer, and the like may be installed in the vessel. In the vessel, the components are dissolved in the solvent. The prepared dope is taken out from the vessel after it is cooled or the prepared dope is taken out and then is cooled using a heat exchanger or the like.

The polymer solution (dope) may be prepared according to a cooling and dissolving method. First, a polymer is added gradually in an organic solvent while it is agitated at a temperature in the proximity of the room temperature (−10° C. to 40° C.). To use two or more solvents, the adding order is not limited. For example, after a polymer is added into the main solvent, any other solvent (for example, a gel solvent of alcohol or the like) may be added or conversely the main solvent after a polymer is moistened with a gel solvent may be added; it is effective for preventing heterogeneous dissolving. Preferably, the polymer amount is adjusted so that the polymer is contained in 10 to 40% by mass in the mixture.

More preferably, the polymer amount is 10 to 30% by mass. Further, any desired additive described later may be added into the mixture.

Next, the mixture is cooled to −100° C. to −10° C. (preferably, −80° C. to −10° C.; more preferably, −50° C. to −20° C.; most preferably, −50° C. to −30° C.). The mixture can be cooled in a dry ice methanol bath (−75° C.) or a cooled diethylene glycol solution (−30° C. to −20° C.), for example. Thus cooled, the mixture of the polymer and the organic solvent is solidified. The cooling speed is not limited; for batch-type cooling, an efficient still needs to be used for reaching a predetermined cooling temperature because the viscosity of the polymer solution increases with cooling and the cooling efficiency is degraded.

In the cooling and dissolving method, after the polymer solution is swollen, it may be transported in a short time in a cooling device set to a predetermined cooling temperature. The cooling speed is more preferable as it is higher; 10000° C./second is the theoretical upper limit; 1000° C./second is the technical upper limit; and 100° C./second is the practical upper limit. The cooling speed is a value resulting from dividing the difference between the temperature at the cooling start time and the final cooling temperature by the time between the cooling start and reaching the final cooling temperature. Further, if the polymer solution is warmed to 0° C. to 200° C. (preferably, 0° C. to 150° C.; more preferably, 0° C. to 120° C.; most preferably, 0° C. to 50° C.), it becomes a solution with the polymer flowing in the organic solvent. To increase the temperature, the polymer solution may be left standing at room temperature or may be warmed in a hot bath.

Thus, a uniform solution is obtained. If the dissolving is insufficient, cooling and warming may be repeated. Whether or not the dissolving is sufficient can be determined simply by visually observing the appearance of the solution. In the cooling and dissolving method, it is desirable that a sealed vessel should be used to avoid inclusion of moisture caused by moisture condensation at the cooling time. In the cooling and warming operation, if pressurization is executed at the cooling time and pressure reduction is executed at the warming time, the dissolving time can be shortened. To execute pressurization and pressure reduction, it is desirable that a pressure-resistant vessel should be used.

A solution of 20% by mass with cellulose acetate (acetylation degree: 60.9%, average viscosity degree of polymerization: 299) dissolved in methyl acetate by the cooling and dissolving method involves a pseudo phase transition point between a sol state and gel state existing in the proximity of 33° C. and becomes a uniform gel state at this temperature or less according to differential scanning calorimetry (DSC). Therefore, the solution needs to be kept at the pseudo phase transition temperature or more, preferably at a temperature of about 10° C. higher than the gel phase transition temperature. However, the pseudo phase transition temperature varies depending on the acetylation degree and the average viscosity degree of polymerization of cellulose acetate, the solution concentration, and the organic solvent used.

A polymer film is manufactured according to the solvent cast method from the prepared polymer solution (dope). Preferably, the above-described retardation increasing agent is added to the dope.

The dope is cast on a drum or a band and the solvent is evaporated to form a film. Preferably, the concentration of the dope before casting is adjusted so that the solid matter amount becomes 10% to 40%; more preferably, 15% to 35%. Preferably, the surface of the drum or the band is finished to a mirror surface state. The casting and drying method in the solvent cast method is described in U.S. Pat. Nos. 2,336,310, 2,367,603, 492,078, 2,492,977, 2,492,978, 2,607,704, 2,739,069, and 2,739,070, British Patent Nos. 640731 and 736892, JP-B-45-4554, JP-B-49-5614, JP-A-60-176834, JP-A-60-203430, and JP-A-62-115035. Preferably, the dope is cast on a drum or a band whose surface temperature is 40° C. or less. Preferably, after casting, the dope is exposed to the air for two seconds or more to dry the dope. The obtained film can be stripped off from the drum or the band and further can be dried with high-temperature warm air with the temperature changed successively from 100° C. to 160° C. to evaporate the remaining solvent. This method is described in JP-B-5-17844. The method makes it possible to shorten the time between the casting and the stripping. To execute the method, the dope needs to gel at the surface temperature of the drum or the band at the casting time.

A plurality of polymer solutions may be cast.

To cast a plurality of polymer solutions, a film can be manufactured while the polymer solutions are cast from a plurality of casting ports arranged with spacing in the traveling direction of a supporter and are deposited (described in JP-A-61-158414, JP-A-1-122419, and JP-A-11-198285). A film can also be manufactured by casting a polymer solution from two casting ports (described in JP-B-60-27562, JP-A-61-94724, JP-A-61-947245, JP-A-61-104813, JP-A-61-158413, and JP-A-6-134933). Further, a polymer film casting method of wrapping a flow of a high-viscosity polymer solution in a low-viscosity polymer solution and pushing out the high-viscosity and low-viscosity polymer solutions at the same time (described in JP-A-56-162617) can also be adopted.

A method of manufacturing a film using two casting ports, stripping off a film molded on a supporter through the first casting port, and executing second casting on the side in contact with the supporter face (described in JP-B-44-20235) can also be executed. The plurality of polymer solutions may be the same solution. To provide a plurality of polymer layers with different functions, a polymer solution responsive to the function may be pushed out from the casting port.

A polymer solution can also be cast at the same time as the application liquid of any other functional layer (for example, adhesive layer, dye layer, antistatic layer, antihalation layer, UV absorption layer, polarizing layer).

With a conventional single layer liquid, it is necessary to push out a high-viscosity polymer solution at a high concentration to make a necessary film thickness. In this case, often, the stability of the polymer solution is poor, a solid occurs, foreign substances enter, or the track distortion is defective, leading to a problem. To solve this problem, a plurality of polymer solutions are cast from casting ports, so high-viscosity polymer solution can be pushed out onto a supporter at the same time, the track distortion also gets better, and an excellent sheet film can be manufactured. Further, dense polymer solution is used, so the drying load can be decreased and the film production speed can be further increased.

To improve the mechanical property or increase the drying speed, a plasticizer can be added to the polymer film. Phosphate or carboxylate is used as the plasticizer. Examples of phosphate include triphenyl phosphate (TPP) and tricresyl phosphate (TCP). As carboxylate, phthalate ester and citrate are representative. Examples of phthalate ester include dimethyl phthalate (DMP), diethyl phthalate (DEP), dibutyl phthalate (DBP), dioctyl phthalate (DOP), diphenyl phthalate (DPP), and diethyl hexyl phthalate (DEHP). Examples of citrate include O-acetyl triethyl citrate (OACTE) and O-acetyl tributyl citrate (OACTB). Other examples of carboxylate include butyl oleate, methyl acetyl ricinoleate, dibutyl sebacate, and various kinds of trimellitate. Phthalate plasticizers (DMP, DEP, DBP, DOP, DPP, and DEHP) are preferably used. DEP and DPP are particularly preferably used.

Preferably, the addition amount of the plasticizer is 0.1 to 25% by mass of the polymer amount; more preferably, 1 to 20% by mass; most preferably, 3 to 15% by mass.

An antidegradant (for example, antioxidant, peroxide decomposer, radical inhibitor, metal deactivator, acid trapping agent, amine) may be added to the polymer film. The antidegradant is described in JP-A-3-199201, JP-A-5-1907073, JP-A-5-194789, JP-A-5-271471, and JP-A-107854. Preferably, the addition amount of the antidegradant is 0.01 to 1% by mass of the prepared solution (dope); more preferably, 0.01 to 0.2% by mass. If the addition amount is less than 0.01% by mass, the effect of the antidegradant is hardly recognized. If the addition amount exceeds 1% by mass, bleed out of the antidegradant to the film surface can be observed. Particularly preferred antidegradants are butylated hydroxytoluene (BHT) and tribenzylamine (TBA).

Retardation of the manufactured polymer film can be adjusted by further performing stretching treatment. Preferably, the stretching magnification is 3% to 100%. Preferably, the thickness of the post-stretched polymer film is 20 to 200 µm; more preferably, 30 to 100 µm. The condition of the stretching treatment is adjusted, so the standard deviation of the angle of the slow axis of the optical compensation sheet can be lessened. The stretching treatment can be executed using a tenter. When a tenter is used to execute lateral stretching for the film manufactured by the solvent cast method, the state of the post-stretched film is controlled, so the standard deviation of the angle of the slow axis of the film can be lessened. Specifically, stretching treatment of adjusting the retardation value is performed using the tenter and the polymer film just after stretching is kept in the proximity of the glass transition temperature of the film under a stretching magnification between the maximum stretching magnification and a half of the maximum stretching magnification, so that the standard deviation of the angle of the slow axis can be lessened. If the polymer film is kept at a temperature lower than the glass transition temperature of the film, the standard deviation grows.

When longitudinal stretching is performed between rolls, the standard deviation of the angle of the slow axis can also be lessened by widening the distance between the rolls.

To provide the polymer film with not only the function of the transparent supporter of the optical compensation sheet, but also a function of a transparent protective film of the polarization film, the polymer film is preferably subjected to surface treatment.

As the surface treatment, corona discharge treatment, glow discharge treatment, flame treatment, acid treatment, alkali treatment, or ultraviolet irradiation treatment is executed. Preferably, the acid treatment or the alkali treatment is executed; more preferably, the alkali treatment is executed. If the polymer is cellulose acetate, the acid treatment or the alkali treatment is executed as saponification treatment for cellulose acetate.

[Alignment Film]

An alignment film has a function of defining the alignment direction of a discotic compound of an optically anisotropic layer.

The alignment film can be provided by means of rubbing of an organic compound (preferably, a polymer), oblique deposition of an inorganic compound, formation of a layer having a microgroove, accumulation of organic compound (for example, ω-tricosane acid, dioctadecyl methyl ammonium chloride, stearyl acid methyl) according to a Langmuir-Blodgett method (LB film), or the like. Further, an alignment film for producing an alignment function by giving an electric field, giving a magnetic field, or light irradiation is also known. Preferably, the alignment film is formed by rubbing treatment of a polymer. Polyvinyl alcohol is a preferred polymer. Denatured polyvinyl alcohol with a hydrophobic group bonded is particularly preferred. Since the hydrophobic group has an affinity for a discotic compound of an optically anisotropic layer, the discotic compound can be uniformly aligned by introducing the hydrophobic group into polyvinyl alcohol. The hydrophobic group is bonded to the main chain termination or a side chain of polyvinyl alcohol. Preferably, the hydrophobic group is a fatty group (preferably, alkyl group or alkenyl group) or aromatic with the number of carbon atoms 6 or more. To bond the hydrophobic group to the main chain termination of polyvinyl alcohol, preferably a joint group is introduced between the hydrophobic group and the main chain termination. Examples of the joint group include —S—, —C(CN)$R^1$—, —$NR^2$—, —CS—, and a combination thereof. $R^1$ and $R^2$ are each an alkyl group with the number of hydrogen atoms or carbon atoms 1 to 6 (preferably, an alkyl group with the number of carbon atoms 1 to 6).

To introduce the hydrophobic group into a side chain of polyvinyl alcohol, a part of an acetyl group (—CO—$CH_3$) contained in vinyl acetate units (unsaponified) remaining in polyvinyl alcohol may be replaced with an acyl group (—CO—$R^3$) with the number of carbon atoms 7 or more. $R^3$ is a fatty group or aromatic with the number of hydrogen atoms or carbon atoms 6 or more. Commercially available denatured polyvinyl alcohol (for example, MP103, MP203, R1130 manufactured by Kuraray Co., Ltd.) may be used.

Preferably, the saponification degree of (denatured) polyvinyl alcohol used for the alignment film is 80% or more. Preferably, the polymerization degree of (denatured) polyvinyl alcohol is 200 or more.

The rubbing treatment is executed by rubbing the surface of the alignment film several times with paper or a cloth in a given direction. Preferably, a cloth filled uniformly with fibers uniform in the length and the size is used.

If the alignment film is removed after the discotic compound of the optically anisotropic layer is aligned using the alignment film, the alignment state of the discotic compound can be kept. That is, the alignment film is indispensable for manufacturing the optical compensation sheet, but not indispensable for the manufactured optical compensation sheet. To provide the alignment film between the transparent supporter and the optically anisotropic layer, an undercoat layer (adhesive layer) may be further provided between the transparent supporter and the alignment film.

[Optically Anisotropic Layer]

The optically anisotropic layer is formed of a discotic compound. The discotic compound generally has an optically negative uniaxial property. Preferably, in the discotic compound, the angle between the disk face and the transparent supporter face changes in the depth direction of the optically anisotropic layer (hybrid-aligned). The optical axis of the discotic compound exists in the normal direction of the disk face. The discotic compound has a birefringent property that the refractive index in the disk face direction is larger than that in the optical axis direction.

Preferably, the optically anisotropic layer is formed by aligning a discotic compound by the above-described alignment film and fixing the discotic compound in the alignment state. Preferably, the discotic compound is fixed by a polymerization reaction.

The optically anisotropic layer does not contain any direction where the retardation value is 0. In other words, the minimum value of the retardation of the optically anisotropic layer is a value exceeding 0. Specifically, the Re retardation value of the optically anisotropic layer measured with light of a wavelength of 632.8 nm is preferably 10 to 100 nm.

Preferably, the optically anisotropic layer has values of Re (632.8 nm), Re (40°), and Re (−40°) satisfying the following expressions (I) and (II):

$$0.1 < Re(40°)/Re(632.8\text{ nm}) < 2.0 \quad (I)$$

$$0.1 < Re(-40°)/Re(632.8\text{ nm}) < 1.0 \quad (II)$$

In expressions (I) and (II), Re (632.8 nm) is the Re retardation value of the optically anisotropic layer measured with light of a wavelength of 632.8 nm, Re (40°) is the Re retardation value measured by entering light of a wavelength of 632.8 nm with the slow axis of the optically anisotropic layer controlled to a tilting axis and the tilting angle controlled to (40°), and Re (−40°) is the Re retardation value measured by entering light of a wavelength of 632.8 nm with the slow axis of the optically anisotropic layer controlled to a tilting axis and the tilting angle controlled to (−40°). Positive or negative of the tilting angle is determined so that Re (40°)>Re (−40°).

More preferably, Re (450 nm) and Re (550 nm) satisfy similar expressions to (I) and (II) and most preferably, all of Re with the wavelength of 380 nm to 780 nm satisfy similar expressions to (I) and (II).

The discotic compound is described in various documents (C. Destrade et al., Mol. Crysr. Liq. Cryst., vol. 71, page 111 (1981); Quarterly Chemical Reviews, edited Chemical Society of Japan, No. 22, Chemistry of Liquid Crystal, Chap. 5 and Chap. 10, Section 2 (1994); B. Kohne et al., Angew. Chem. Soc. Chem. Comm., page 1794 (1985); and J. Zhang et al., J. Am. Chem. Soc., vol. 116, page 2655 (1994)). A particularly preferred discotic compound is described in JP-A-8-50286. Polymerization of a discotic compound is described in JP-A-8-27284.

The optically anisotropic layer can be formed by applying an application liquid containing a discotic compound and a polymerization initiator and any desired component as required onto the alignment film. Preferably, the thickness of the optically anisotropic layer is 0.5 to 100 µm, and more preferably, 0.5 to 30 µm.

The aligned discotic compound is fixed with the alignment state maintained. Preferably, the discotic compound is fixed by a polymerization reaction. The polymerization reaction includes a thermal polymerization reaction using a thermal polymerization initiator and a light polymerization reaction using a light polymerization initiator. The light polymerization reaction is preferred.

Examples of the light polymerization initiator include an α-carbonyl compound (described in U.S. Pat. Nos. 2,367,661 and 2,367,670), acyloin ether (described in U.S. Pat. No. 2,448,828), an α-hydrocarbon substituted aromatic acyloin compound (described in U.S. Pat. No. 2,722,512), a polynuclear quinone compound (described in U.S. Pat. Nos. 3,046,127 and 2,951,758), a combination of triaryl imidazole dimer and p-aminophenyl ketone (described in U.S. Pat. No. 3,549,367), acridine and phenazine compound (described in JP-A-60-105667 and U.S. Pat. No. 4,239,850), and an oxadiazole compound (described in U.S. Pat. No. 4,212,970).

Preferably, the use amount of the light polymerization initiator is 0.01 to 20% by mass of the solid content of the application liquid, and more preferably, 0.5 to 5% by mass.

Preferably, as light irradiation for polymerization of the discotic compound, ultraviolet irradiation is used.

Preferably, the irradiation energy is 20 to 5000 mJ/cm$^2$, and more preferably, 100 to 800 mJ/cm$^2$. To promote the light polymerization reaction, light irradiation may be executed under a heating condition. A protective layer may be provided on the optically anisotropic layer.

Next, a second embodiment in which a light emission state from the liquid crystal display is detected, and tint change is corrected on the basis of the detection result will be described.

Figure 18:
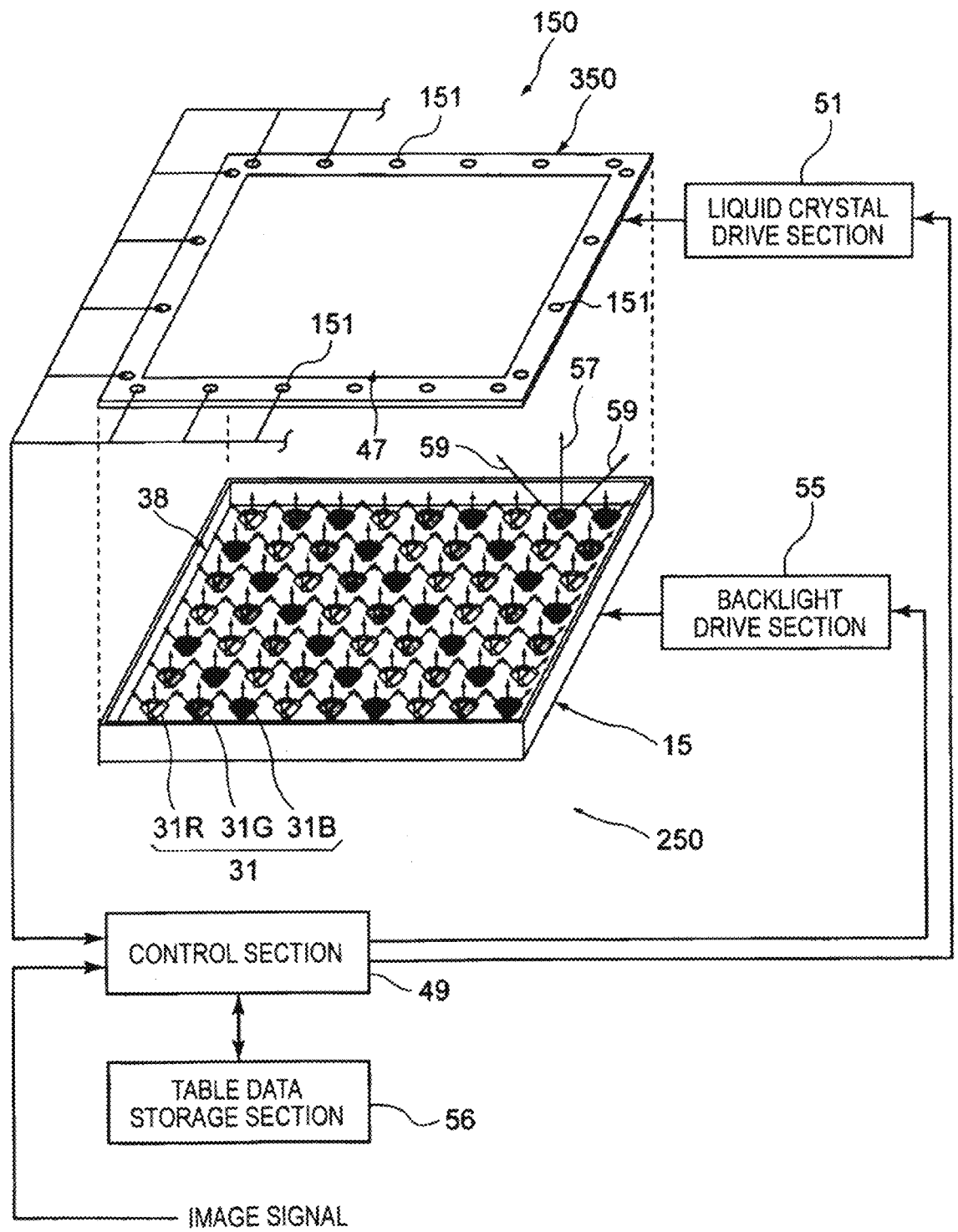
FIG. 18 is a conceptual perspective view of a liquid crystal display including an optical sensor.

FIG. 18 is a conceptual perspective view of a liquid crystal display according to the invention.

A liquid crystal display 150 according to this embodiment includes main components of a backlight unit 250 and a liquid crystal panel 350. The backlight unit 250 has the same configuration as shown in FIG. 2. The backlight unit 250 has a plurality of light sources 31 arranged below the light emission surface and uses LEDs for emitting red light, green light, and blue light of the three primary colors of light as light sources, thereby mixing red light, green light, and blue light emitted from the LEDs to generate light based on white light. The backlight unit 250 is configured such that red LEDs 31R, green LEDs 31G, and blue LEDs 31B are arranged in a lattice or alternately in the XY direction on the printed wiring board.

The liquid crystal panel 350 has the same configuration as shown in FIG. 1, and is provided with a diffusion plate 35, a diffusion sheet 37, and a prism sheet 39 on the light emission side of the backlight unit 250. In the backlight unit 250, red light, green light, and blue light are emitted from the red LEDs 31R, the green LEDs 31G, and the blue LEDs 31B respectively, red light, green light, and blue light emitted from the LEDs 31R, 31G, and 31B are naturally mixed while proceeding in the direction in which the diffusion plate 35, the diffusion sheet 37, and the prism sheet 39 are provided, and light lights the liquid crystal panel 350.

In this embodiment, TN (Twisted Nematic) liquid crystal is used as the liquid crystal panel 350. The liquid crystal cell substrate 41 is divided into liquid crystal cells, and on the light incidence side and the light emission side of the liquid crystal cell substrate 41, a phase difference film 43 and a polarizing plate 45 are provided from the liquid crystal cell substrate 41 side. Light emitted from the prism sheet 39 of the backlight unit 250 is incident on the polarizing plate 45 on the light incidence side of the liquid crystal panel 350, then passes through the phase difference film 43 and enters the liquid crystal cell substrate 41, further passes through the phase difference film 43 and the polarizing plate 45, and is observed on a display surface 29.

The liquid crystal cell substrate 41 is a transmission type in which part of light (illumination light) incident from the rear surface of the liquid crystal cell substrate 41 passes through the liquid crystal cell substrate 41 and is emitted to the display surface side, so each liquid crystal cell is viewed by the human eye. The polarization axis of the polarizing plate 45 arranged at the rear surface side and the polarization axis of the polarizing plate 45 arranged on the display surface side are orthogonal to each other, that is, in a cross nicol state.

As shown in FIG. 18, a control section 49 is connected to the backlight unit 250, and an image (video) signal is input to the control section 49. A liquid crystal drive section 51 is connected to the control section 49. The liquid crystal drive section 51 performs drive control of the liquid crystal cells of the liquid crystal cell substrate 41 on the basis of the image signal output from the control section 49. The control section 49 has a light emission luminance controlling section (not shown), and the light emission luminance controlling section generates a light emission luminance controlling signal of the red LEDs 31R, the green LEDs 31G and the blue LEDs 31B. A backlight drive section 55 is connected to the control section 49. The backlight drive section 55 drives the red LEDs 31R, the green LEDs 31G, and the blue LEDs 31B on the basis of the light emission luminance signal sent from the control section 49.

As shown in FIG. 3, the backlight unit 250 controls separately light emission spectra in a front direction 57 which becomes a normal direction of the light emission surface 38 and a slanting direction 59 inclined at a predetermined angle from the normal direction. That is, the light emission spectra in the front direction 57 and the slanting direction 59 can be controlled separately by the control section 49 and the light emission luminance controlling section, directivity and light emission intensity can be controlled separately for each of the R, G, and B colors, and chromaticity (spectrum) can be adjusted in the front direction 57 and the slanting direction 59.

The liquid crystal display 150 is provided with a plurality of optical sensors 151 shown in FIG. 18 arranged alternately on the liquid crystal panel 350 as a light detection unit. The optical sensors 151 detect light information from the light source 31 emitted from the liquid crystal panel 350. That is, the optical sensors 151 detect light intensity information for light components after emission from the light source 31 and passing through the liquid crystal panel 350. The optical sensors 151 are arranged at the edge in the vicinity of the liquid crystal panel 350 so as not to interfere with display. The optical sensors 151 are arranged at positions covered by a decorative sheet in the final product of the liquid crystal display 150. The number of optical sensors 151 provided in the liquid crystal panel 350 may be increased as required.

For example, in the case of a large liquid crystal display panel or the like, leak light may significantly change with a difference in the place of the panel. For this reason, correct leak light may not be detected only with a single sensor. Accordingly, as in the liquid crystal display 150 shown in FIG. 18, a plurality of optical sensors 151 are arranged independently at different places on the liquid crystal panel 350, so correct leak light can be detected for each place, or average leak light of the entire panel can be detected. Further, even if leak light significantly changes according to the place of the panel, compensation control can be performed independently for each divided area, and thus correct compensation can be performed over the entire panel.

Figure 19:
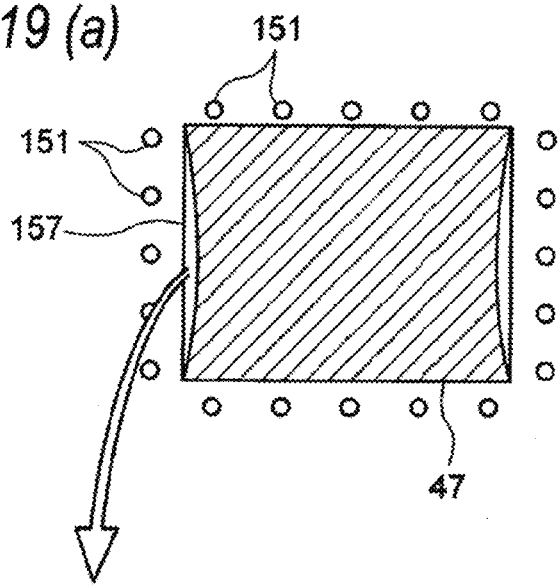
FIG. 19 is a diagram showing an example where leak light due to a light leakage phenomenon of a liquid crystal panel is detected and display light is modulated, specifically, (a) is an explanatory view showing a light leakage area on left and right ends of a display surface, (b) is an explanatory view showing an example where a low voltage is applied to a second LED element inclined toward the center of a display screen in the multi-directional irradiation unit, and (c) is an explanatory view showing an example where a luminance distribution of a left light source at the center of the display screen is reduced by ΔL and corrected.
Figure 19:
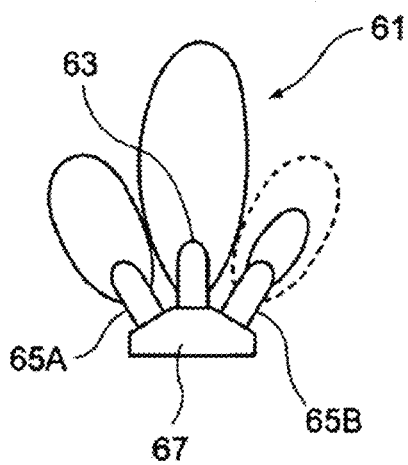
Figure 19:
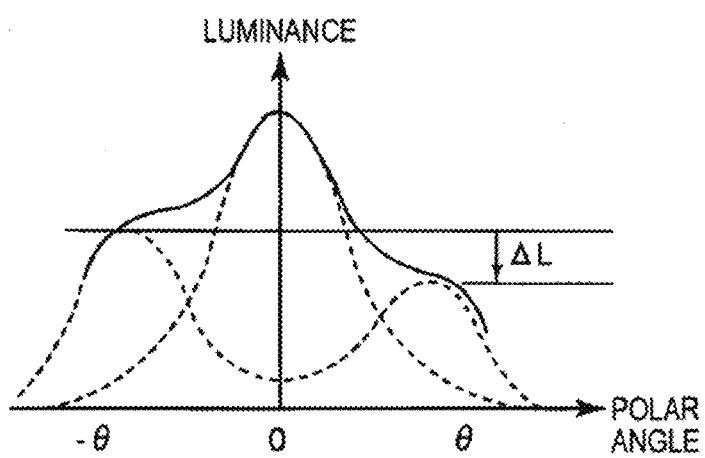

FIG. 19 is an explanatory view showing an example where leak light due to a light leakage phenomenon of the liquid crystal panel is detected and display light is modulated.

The control section 49 creates a leak light map indicating a distribution state of leak light on the display surface 47 of the liquid crystal panel 350 on the basis of the detection values of leak light detected by the plurality of optical sensors 151. For example, the maximum value or minimum value of leak light is detected on the basis of leak light detected by the plurality of optical sensors 151 and information of the position where each sensor is provided, and a proper analysis process is executed so as to grasp the distribution state regarding leak light on the panel.

Next, the control section 49 executes compensation control of the applied voltage to the backlight drive section 55 (see FIG. 18) independently for each area of the liquid crystal panel 350. That is, the correspondence relationship between the position of each independently controllable area and the position on the leak light map is examined, and information of corresponding leak light is acquired from the leak light map and stored in a table data storage section 56. The control section 49 acquires a correction value of an applied voltage corresponding to leak light for each of the R, G, and B colors with reference to a correction table stored in the table data storage section 56. The acquired correction value is provided to the backlight drive section 55 as a drive signal, together with information for specifying the place of the relevant area. That is, the control section 49 changes light emission intensity for the second LED element 65B on the basis of the light information detected by the optical sensors 151 to controlled separately the light emission spectra in the front direction of the light emission surface 38 and the slanting direction.

For example, with regard to light leakage areas 157 at the left and right ends of the display surface 47 shown in FIG. 19 (*a*), as shown in FIG. 19 (*b*), a low voltage is applied to the second LED elements 65B inclined toward the center of the display screen in the underlying multi-directional irradiation units 61. As a result, as shown in FIG. 19 (*c*), the luminance distribution of the left light source at the center of the display screen is reduced by ΔL and corrected. Thus, leak light at the left and right ends of the display surface 47 can be cancelled, and a light emission distribution can have uniform luminance. The light leakage areas are not limited to the left and right ends of the display surface 47. With regard to leak light at the upper and lower end of the display surface 47 or at the four corners of the display surface 47, by reducing and correcting an applied voltage to LED elements inclined toward the center of the display screen in the same manner as described above, leak light is cancelled.

Therefore, according to the above-described backlight unit 250, with the control section 49 for controlling separately the light emission spectra in the front direction 59 which becomes the normal direction of the light emission surface 38 and the slanting direction 59 inclined at a predetermined angle from the normal direction, directivity and light emission intensity can be controlled separately for each of the R, G, and B colors, chromaticity (spectrum) can be varied in the front direction 57 and the slanting direction 59, and viewing angle dependency of tint of a display image can be improved. This asymmetrical light emission distribution is particularly properly used when a light emission state changes depending on the place in the display screen, and subtle tint change can be more reliably eliminated.

In particular, in a black display state on a large display screen, leak light due to a light leaking phenomenon at the upper, lower, left, and right ends of the display surface 47 or at the four corners of the display surface 47 is detected, and directivity and light emission intensity of the light source 31 can be controlled separately for each of the R, G, and B colors so as to cancel leak light. Therefore, deterioration of image quality due to the light leakage phenomenon can be suppressed.

The liquid crystal display 150 according to the invention includes the backlight unit 250, and the liquid crystal panel 350 arranged facing the backlight unit 250. For this reason, for the color component insufficient in the slanting direction 59 in the proper light transmission characteristic caused by the optically-compensatory film of the liquid crystal panel 350, the light emission spectrum in the slanting direction 59 is controlled separately for each of the R, G, and B colors, so viewing angle dependency of tint of the display screen can be improved. Then, directivity and light emission intensity of the light source 31 are controlled separately for each of the R, G, and B colors so as to cancel leak light, so no tint is noticed when viewed from the slanting direction. In addition, a high-quality liquid crystal display image with no light leakage phenomenon can be obtained.

Leak light due to the light leakage phenomenon may be detected when display of the liquid crystal display 150 starts, or may be regularly detected for each predetermined time after display starts. Alternatively, detection may start in accordance with a press operation of a button. For example, black display may be forcibly performed when the liquid crystal display 150 is powered on, and the black level relative to black display may be detected by the optical sensors 151.

Next, correction of tin change caused by temperature-humidity change will be described.

Generally, when temperature and humidity change, the phase difference of an optically-compensatory film in a liquid crystal display also changes due to expansion or shrinkage of the film or change in stress from a polarizing plate, an adhesive, or the like, and consequently change also occurs in displayed tint.

Then, a temperature-humidity sensor is provided in the liquid crystal panel, and the BGR light emission intensity ratio of LED is changed according to the values of temperature and humidity detected by the temperature-humidity sensor, so that occurring tint change can be corrected.

First, a third embodiment of the liquid crystal display according to the invention in which tint change is corrected on the basis of humidity (moisture content) will be described.

Figure 20:
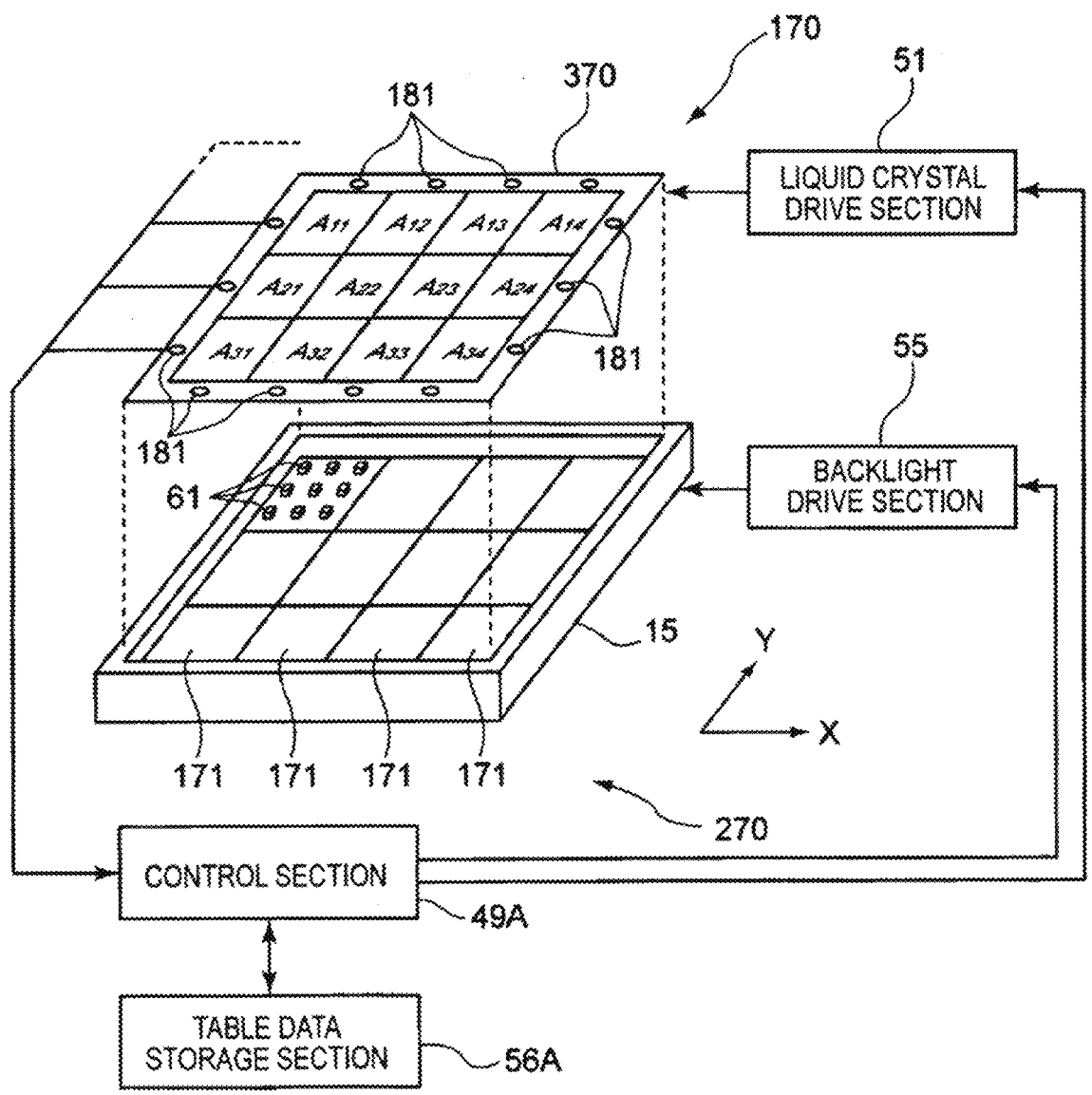
FIG. 20 is a block diagram showing the configuration of main sections of a liquid crystal display including a moisture content sensor.
Figure 21:
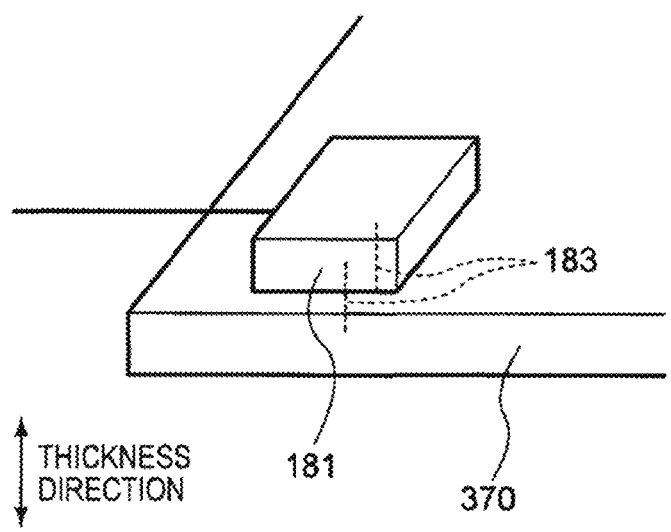
FIG. 21 is a perspective view showing an attachment state of a moisture content sensor provided in the liquid crystal display shown in FIG. 20.

FIG. 20 is a block diagram showing the configuration of main components of a liquid crystal display having a moisture detection unit according to an embodiment. FIG. 21 is a perspective view showing an attachment state of a moisture content sensor provided in the liquid crystal display shown in FIG. 20. The same members as the members shown in FIGS. 1 to 19 are represented by the same reference numerals, and descriptions thereof will not be repeated.

A liquid crystal display 170 according to this embodiment is configured such that a display area of a liquid crystal panel 370 is divided into a plurality of independently controllable areas (A11, A12, A13, A14, A21, A22, A23, A24, A31, A32, A33, and A34) relative to the axial directions of a horizontal direction (X) and a vertical direction (Y). A backlight unit 270 is structured so as to control independently an applied voltage for each of blocks 171 divided corresponding to the areas. Each area is selected by control of a line selector (not shown) or the like.

In the liquid crystal display 170, a plurality of moisture content sensors 181 are provided at different places on the liquid crystal panel 370 as a moisture detection unit. As shown in FIG. 20, the moisture content sensors 181 are arranged at the edge in the vicinity of the liquid crystal panel 370 so as not to interfere with display. The moisture content sensors 181 are arranged at the positions covered with a decorative sheet in the final product of the liquid crystal display. The number of moisture content sensors 181 provided in the liquid crystal panel 370 may be increased as required.

For example, in the case of a large liquid crystal display panel or the like, environmental humidity or moisture content may significantly change at different places of the panel. For this reason, the correct moisture content may not be detected with only a single sensor. Accordingly, as in the liquid crystal display 170 shown in FIG. 20, a plurality of moisture content sensors 181 are arranged independently at different places on the liquid crystal panel 370, so the moisture content can be detected more accurately for each place, or the average moisture content of the entire panel can be detected. Further, even if the moisture content significantly changes according to the place of the panel, compensation control can be performed independently for each divided area, and thus correct compensation can be performed over the entire panel.

As shown in FIG. 21, each moisture content sensor 181 is a resistive moisture content meter using electrical resistance mounted on the surface of the liquid crystal panel 370. The moisture content sensor 181 has a needle-shaped electrode 183 and is attached such that the electrode 183 protrudes from the polarizing plate and comes into contact with the optically-compensatory film (for example, the phase difference film 43) (see FIG. 1). Thus, the moisture content of moisture contained inside the optically-compensatory film in the liquid crystal panel 370 is detected. As the moisture content sensor 181, in addition to the above-described electrical moisture content meter (resistive moisture content meter), various types of sensors, such as a high-frequency moisture content meter, a heating type, a dielectric type, an electromagnetic type, a thermal conduction type, and the like, may be used.

A control section 49A extracts a detected value HD of the moisture content sensor 181 to constantly grasp the moisture content, and acquires a correction value for controlling the display characteristic of the liquid crystal panel 370 in accordance with the result or sends the acquired correction value.

A table data storage section 56A has a memory (ROM or RAM) that the control section 31A can access, and stores in advance a correction table having a group of data necessary for compensating for change in the optical characteristic with change in the moisture content of the optically-compensatory film.

The control section 49A calculates correction values independently for R, and B color components in accordance with information of the moisture content obtained from the detection result of the moisture content sensor 181 and the details of the correction table of the table data storage section 56A, and provides a drive signal based on the correction values to the backlight drive section 55.

If humidity changes, the optical characteristic (retardation) of the optically-compensatory film changes, so even when black display is performed, any one of the R, G, and B light components appears on the display surface of the liquid crystal panel 370, and tint different from pure black appears.

Therefore, feedback control for controlling independently the applied voltage of the R, G, and B multi-directional irradiation units 61 is performed on the basis of information detected by the moisture content sensors 181 so as to perform correction corresponding to change in the characteristic of the optically-compensatory film. Thus, tint different from black can be eliminated.

Figure 22:
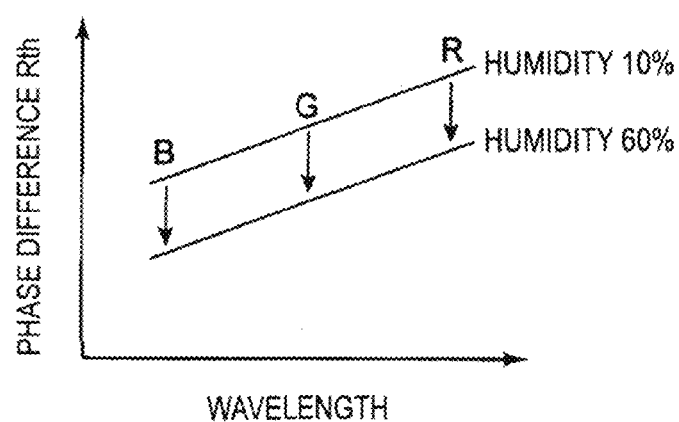
FIG. 22 is a graph conceptually showing the relationship between humidity and a phase difference for each wavelength of light regarding an optically-compensatory film provided in the liquid crystal panel shown in FIG. 20.

FIG. 22 is a graph conceptually showing the relationship between humidity and a phase difference for each wavelength of light regarding the optically-compensatory film provided in the liquid crystal panel shown in FIG. 20.

A retardation value (Rth) in the thickness direction which is one of the optical characteristics of the optically-compensatory film differs depending on the wavelength of light to be transmitted (a difference between R, G, and B), and further changes depending on humidity. Accordingly, if humidity or the like changes, the retardation value (Rth) of the optically-compensatory film changes, a phase difference affecting light to transmit the liquid crystal panel 370 changes for each wavelength, and change in the amount of light on the display surface occurs. As a result, when black is to be displayed, at least one of the R, G, and B light components slightly appears on the display surface, and the light amount balance between R, G, and B collapses, so tint may appear and reddish black may be displayed in place of the original black. Therefore, it is necessary to compensate for change in the optical characteristic with change in the moisture content of the optically-compensatory film.

Figure 23:
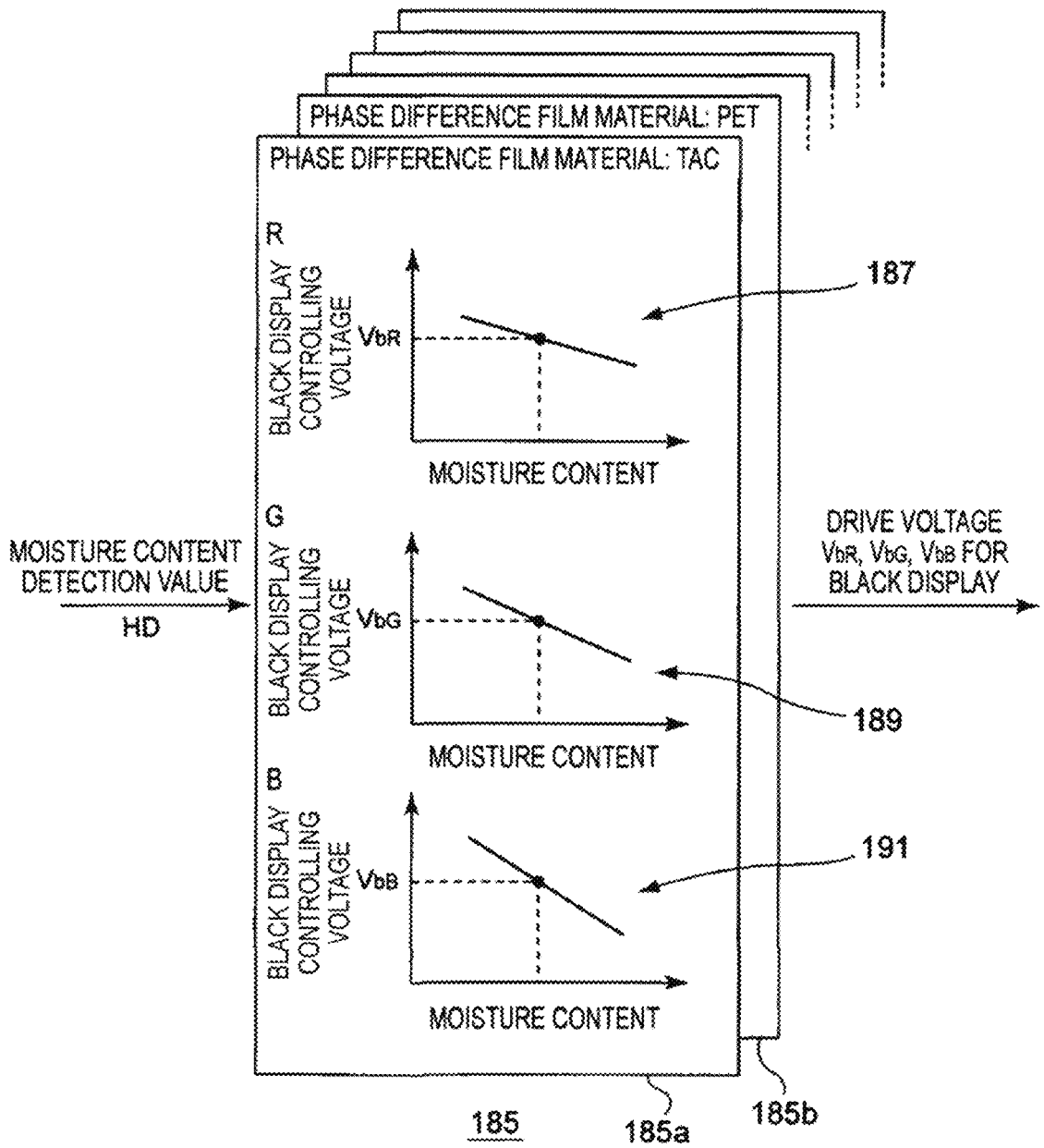
FIG. 23 is a schematic view showing a configuration example of a correction table provided in the liquid crystal display shown in FIG. 20.

FIG. 23 is a schematic view showing a configuration example of the correction table provided in the liquid crystal display shown in FIG. 20.

In a correction table 185, tables 185a, 185b, . . . are prepared independently for the materials (TAC (triacetyl cellulose), PET (polyethylene terephthalate), and the like) of the optically-compensatory film (phase difference film 43). Each table is provided with an R color correction section 187 for holding correction data regarding the R color, a G color correction section 89 for holding correction data regarding the G color, and a B color correction section 91 for holding correction data regarding the B color.

The R color correction section 187 holds a predetermined group of data (a group of data of black display controlling voltages associated with various moisture contents) indicating the relationship between a value indicating a proper voltage to be applied to the multi-directional irradiation unit 61 for the R color and a moisture content when the correct black is to be displayed on the liquid crystal panel 370. Similarly, the G color correction section 189 holds a predetermined group of data indicating the relationship between a value (black display controlling voltage) indicating a proper voltage to be applied to the multi-directional irradiation unit 61 for the G color and a moisture content when the correct black is to be displayed on the liquid crystal panel 370. The B color correction section 191 holds a predetermined group of data indicating the relationship between a value (black display controlling voltage) indicating a proper voltage to be applied to the multi-directional irradiation unit 61 for the B color and a moisture content when the correct black is to be displayed on the liquid crystal panel 370.

The control section 49A calculates a drive voltage VbR for the R color as the correction value from the R color correction section 187 of the correction table 185, a drive voltage VbG for the G color as the correction value from the G color correction section 189, and a drive voltage VbB for the B color from the B color correction section 191 by using the moisture content calculated from the value detected by the moisture content sensor 181. The drive voltages VbR, VbG, and VbB are provided to the backlight drive section 55, so the correct black can be displayed on the liquid crystal panel 370, regardless of change in humidity, or the like.

When an image or the like is to be actually on the liquid crystal panel 370, the drive voltages VbR, VbG, and VbB as the correction values are superimposed on or added to grayscale data of the R, G, and B colors corresponding to the colors and brightness of the pixels of the image to be displayed and then provided to the backlight drive section 55. Thus, an image or the like can be displayed with correct colors.

Meanwhile, when the correct black is to be displayed on the liquid crystal panel 370, the relationship between a proper voltage to be applied to the multi-directional irradiation unit 61 for each color and the moisture content significantly changes depending on the characteristics of an optically-compensatory film to be actually used, in particular, the material forming the optically-compensatory film. Accordingly, the control section 49A acquires in advance information regarding the material forming an optically-compensatory film actually mounted on the liquid crystal panel 370, and selects and uses the table 185a in the correction table 185 when the material is TAC and selects and uses the table 185b in the correction table 185 when the material is PET. Thus, correction regarding the moisture content relative to optically-compensatory films having various characteristics can be performed correctly.

With this liquid crystal display 170, moisture information of the liquid crystal panel 370 is detected by the moisture content sensors 181, and directivity and light emission intensity are controlled separately for each of the R, G, and B colors so as to cancel change in the optical characteristic depending on the moisture content of the liquid crystal panel 370.

Although in the correction table 185 shown in FIG. 23, it is assumed that the relationship between the black display controlling voltage and the moisture content shows linear change, it is possible to cope with curved change only by changing the details of data stored in each table.

Next, a modification of control using the moisture content sensors 181 will be described.

Figure 24:
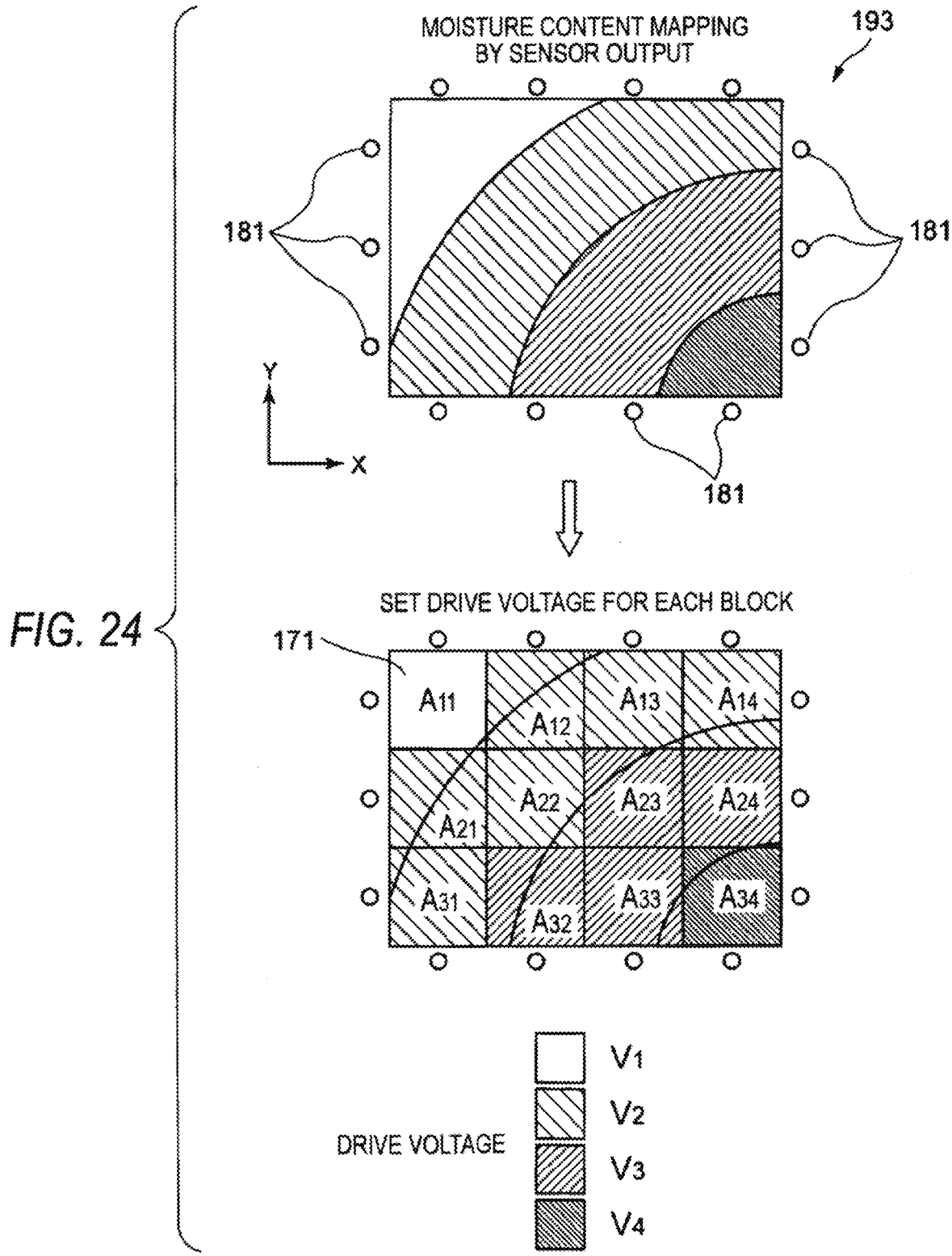
FIG. 24 is a schematic view showing an example of mapping moisture content in the liquid crystal display shown in FIG. 20.

FIG. 24 is a schematic view showing an example of mapping moisture content in the liquid crystal display 170 shown in FIG. 20.

The control section 49A may create a moisture content map 193 indicating the distribution state of moisture content of each area over the entire liquid crystal panel 370 on the basis of the detected values of the moisture content detected by the plurality of moisture content sensors 181. For example, the maximum value or minimum value of the moisture content may be detected on the basis of the moisture content detected by the plurality of moisture content sensors 181 and information of the position where the moisture content sensors are provided, and a proper analysis process may be executed to grasp the distribution state regarding the moisture content on the panel. The example shown in FIG. 24 has the distribution state where the moisture content at the lower right corner of the panel is large, and the moisture content is lowered as it goes toward the upper left corner of the panel.

Next, the control section 49A executes compensation control of an applied voltage by using the moisture content map 193 separately for each divided block 171. That is, the correspondence relationship (see a control example at the middle of FIG. 24) between the position of each independently controllable block 171 and the position on the moisture content map 193 is examined, and information of the corresponding moisture content is acquired from the moisture content map

193. When a plurality of places different in the moisture content on the moisture content map 193 have a correspondence relationship with the position of a single area, a single moisture content having a large area ratio of the same single area may be selected, or an average moisture content obtained by calculation based on the area ratio and a plurality of moisture content may be allocated to the relevant area.

The control section 49A acquires the correction values of the applied voltage for R, G, and B colors corresponding to the moisture content with reference to the correction table stored in the table data storage section 56A. The acquired correction values are provided to the backlight drive section 55 as drive signals, together with information for specifying the place of the corresponding area.

In the control example shown in FIG. 24, it is assumed that a correction value for black indicating an applied voltage V1 is allocated to a block 171 corresponding to the divided area A11 on the liquid crystal panel 370. Similarly, it is assumed that a correction value for black indicating an applied voltage V2 is allocated to a block 171 corresponding to the area A22, a correction value for black indicating an applied voltage V3 is allocated to a block 171 corresponding to the area A23, and a correction value for black indicating a drive voltage V4 is allocated to a block 171 corresponding to the area A34.

The number of areas divided on the liquid crystal panel 370 may be increased as required.

According to this modification, the control section 49A creates a map (see FIG. 24) indicating the distribution state of the moisture content on the basis of the moisture content detected by the moisture content sensors 181 and the positions of the moisture content sensors 181, acquires the correction values for the R, G, and B colors from the moisture content on the basis of the details of the correction table 185 held in the table data storage section 56A for each area on the map, and provides the correction values to the backlight drive section 55 as drive signals, together with information for specifying the position of the relevant area. Therefore, the multi-directional irradiation units 61 on the backlight unit 270 are controlled independently in accordance with the correction values for the R, G, and B colors for each divided block 171. Thus, correction control can be executed independently for each of the plurality of areas, so as in a large liquid crystal display, even if the moisture content is not uniform for each area on the liquid crystal panel 370, proper compensation control can be performed separately for each of the areas different in the moisture content, and proper black display is constantly made possible.

As the moisture content changes, luminance (leak light amount) in the slanting direction as well as tint changes with change in retardation Re and Rth of the phase difference film or change in subrefraction Δn of a liquid crystal layer. For this reason, as in the above-described first and second embodiments, directivity of light emission luminance is also adjusted. Specifically, the amount of emission light in a direction inclined toward the center of the screen relative to the normal of the screen on the periphery of the display surface is reduced with respect to the amount of emission light in the normal direction while taking disparity according to the screen size into consideration. A correction table for adjustment is stored in advance in the table data storage section, a correction value of the amount of emission light is acquired in accordance with the value of the measured moisture content, and the amount of emission light of each LED element is adjusted. In this case, adjustment of the amount of emission light is performed while maintaining a state where the ratio of the amount of emission light of each color is tint-corrected.

Thus, the moisture content map 193 indicating the distribution state of the moisture content of each region over the entire liquid crystal panel 370 is obtained by performing a proper analysis process, and the distribution state of the moisture content on the panel can be grasped. Therefore, more suitable compensation control can be performed for each block 171.

Next, a fourth embodiment of the liquid crystal display according to the invention in which tint change is corrected on the basis of temperature will be described.

Figure 25:
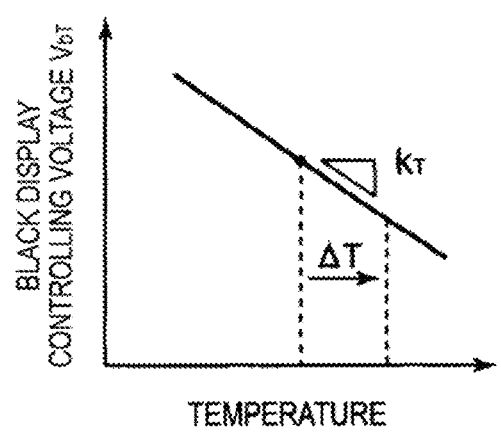
FIG. 25 is a graph showing the relationship between temperature and a desired applied voltage when black display is performed.
Figure 26:
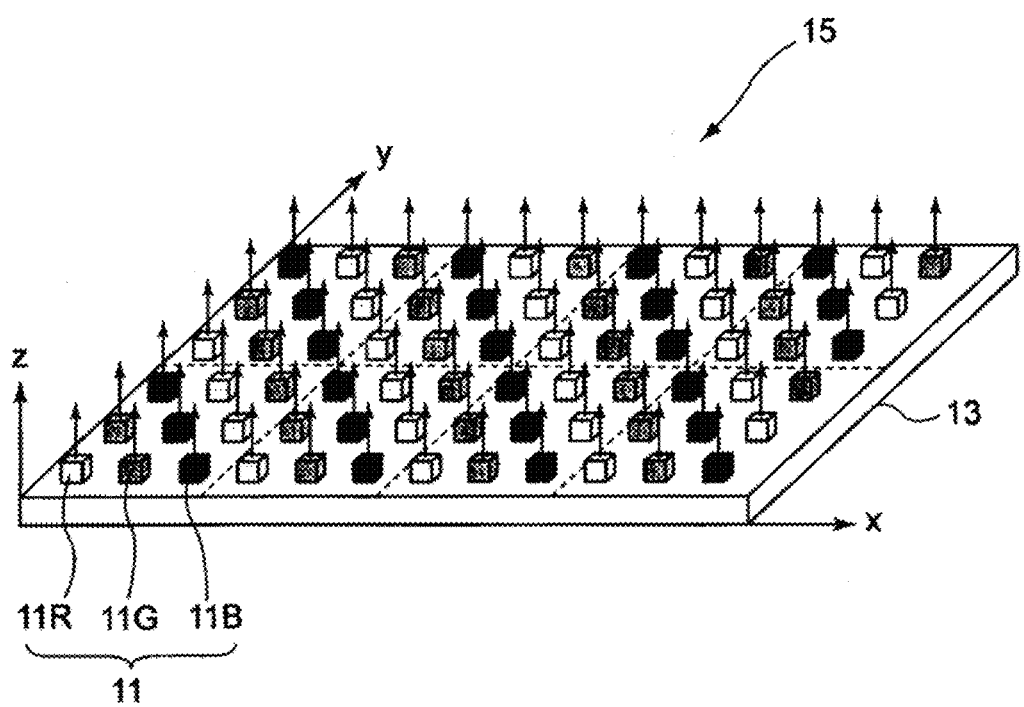
FIG. 26 is a perspective view of a light source section using LEDs according to the related art.
Figure 27:
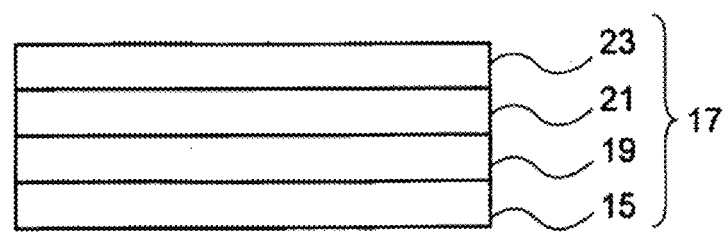
FIG. 27 is a sectional view of a backlight unit of a just-beneath type using LEDs according to the related art.

FIG. 25 is a graph showing the relationship between temperature and a desired applied voltage when black display is performed.

The basic structure and the details of basic control of the fourth embodiment are the same as in the third embodiment. Meanwhile, in the fourth embodiment, correction control is performed according to the temperature of the environment where the liquid crystal display is used.

That is, to compensate for temperature dependency of the liquid crystal panel 11 and the optically-compensatory film, a temperature sensor as a temperature detection unit in place of the moisture content sensors 181 shown in FIG. 20 is used to detect temperature inside or around the liquid crystal panel 370, and the control section 49A executes correction control according to the temperature detected by the temperature sensor.

A liquid crystal display is likely to be influenced by heat generated from a backlight or the like as a lighting device, so preferably, the temperature sensor is inside the liquid crystal panel 370 rather than around the liquid crystal panel 370.

Actually, an optimum applied voltage (black display controlling voltage) VbT for displaying black on the liquid crystal panel 370 tends to change depending on the environmental temperature, as shown in FIG. 25. Accordingly, parameters regarding temperature dependency of the liquid crystal panel 370 and the optically-compensatory film are grasped in advance and held in the control section 49A as constants independently for the R, G, and B colors. Then, the control section 49A calculates the following expression on the basis of a difference ΔT between current temperature T detected by the temperature sensor and a reference temperature (for example, 25° C.) and constants held therein, and corrects the drive voltage to be applied to the backlight drive section 55 for each of the R, G, and B colors.

$$V_R = Vb_R + k_R \Delta T$$

$$V_G = Vb_G + k_G \Delta T$$

$$V_B = Vb_B + k_B \Delta T$$

$Vb_R$, $Vb_G$, $Vb_B$: applied voltage for each color before temperature compensation (after moisture content compensation)

$k_R$, $k_G$, $k_B$: constant for each color (corresponding to a slope in the characteristic in FIG. 25)

$V_R$, $V_G$, $V_B$: applied voltage for each color after temperature compensation The voltages $V_R$, $V_G$, and $V_B$ temperature-compensated as described above are applied to the multi-directional irradiation units 61, so correction according to a difference in temperature can be performed, in addition to correction according to the moisture content of the optically-compensatory film. Instead of controlling the applied voltage as the drive voltage, for example, correction may be performed with an increase or decrease in the duty ratio at the time of pulsed lighting.

As the temperature changes, luminance (leak light amount) in the slanting direction as well as tint changes with change in the retardation Re and Rth of the phase difference film or change in subrefraction Δn of the liquid crystal layer. For this reason, as in the above-described first embodiment, directivity of light emission luminance is also adjusted. Specifically, the amount of emission light in a direction inclined toward the center of the screen relative to the normal of the screen on the periphery of the display surface is reduced with respect to the amount of emission light in the normal direction while taking disparity according to the screen size into consideration. A correction table for adjustment is stored in advance in the table data storage section, a correction value of the amount of emission light is acquired in accordance with the value of the measured temperature, and the amount of emission light of each LED element is adjusted. In this case, adjustment of the amount of emission light is performed while maintaining a state where the ratio of the amount of emission light of each color is tint-corrected.

As described above, light emission intensity of each LED element of the backlight unit is adjusted on the basis of light information detected by a light detection unit, moisture information detected by the moisture detection unit, and temperature information detected by a temperature detection unit to adjust the light emission balance, so viewing angle dependency of tint of a liquid crystal display image can be improved. Then, the optimum light emission intensity balance is controlled on the basis of a plurality of factors by properly combining light information, moisture information, and temperature information, so high-quality image display conforming to the environment is performed.

Although in the foregoing embodiments, the configuration in which only LED elements are used as the first LED element 63 and the second LED elements 65 and 65 has been described, the backlight unit according to the invention may have a hybrid configuration in which fluorescent lights are contained in addition to the LED elements. Light-emitting elements, such as organic EL elements or the like, other than general LED elements may be used. In addition, the invention is not limited to the LED elements, and a configuration may be made such that light is emitted at each position of the backlight by using an optical fiber or a light guide member from a different light source. In this case, a light emission adjustment unit for performing light amount adjustment at each display position of the liquid crystal display may be provided.

Although in the foregoing embodiments, an example of adjustment for black or white display has been described, in the backlight unit according to the invention, adjustment can be made to a different characteristic in halftones, and advantages similar to those described above can be provided.

Example 1

An evaluation result for a display image of a liquid crystal display using various backlight units or various optically-compensatory films will be described.

The evaluation result and the conditions are shown in Table 2.

In Comparative Example 1, a backlight unit is used in which a plurality of LEDs are arranged with the front direction (0°) as the inclination angle of the LEDs, and a TN mode liquid crystal panel is used. An optically-compensatory film of the liquid crystal panel has a wavelength dispersion characteristic (referred to as regular dispersion) that the ratio of a phase difference at a wavelength of 550 nm to a phase difference at a wavelength of 450 nm is larger than 1.0, and the optical characteristics (transmittance, refractive index, and wavelength dispersion characteristics of transmittance and refractive index) of the optically-compensatory film are uniform over the entire surface with no dependency on the position of the display surface. Actually, the temperature-humidity condition differs at the center and on the periphery of the display surface, so the retardation value also differs. For this, the retardation values at the center and on the periphery used for chromaticity calculation are referred to as "actual center" and "actual periphery". In an example where no detector is provided, the actual values may not be estimated, so LED light emission intensity is adjusted on the basis of the measured retardation value under the standard condition of a single film, and the measured value is described in the column "estimated value". In the case where a detector is provided, moisture, temperature, or the like is detected and correction is made, and consequently, an estimated retardation value is an "estimated value". LED light emission intensity is adjusted and decided relative to this estimated value.

In this case, in the backlight unit, in-plane unevenness of the light amount occurred on the light emission surface, and light leakage occurred on the periphery of the light emission surface. Then, the backlight was combined with the above-described liquid crystal panel and tint change at the time image display was measured at the center of the screen and the upper right end of the screen. The u', v' chromaticity was used, and evaluation was made with a gap of the v' value from the light source chromaticity with respect to the chromaticity of the D65 light source as an evaluation index Δv'. The chromaticity was measured by a spectroradiometer (manufactured by TOPCON) within the darkroom from a direction at an angle of direction of 45° and a polar angle of 60° in the VA mode, and from a direction at an angle of direction of 90° and a polar angle of 60° in the TN mode. As a result, Δv' was −0.114 at the center of the screen and −0.134 at the upper right end of the screen.

In Example 1, measurement was made similarly to Comparative Example 1, except that the inclination angle of the LEDs was 45° from the front direction. As a result, the evaluation index Δv' was −0.073 at the center of the screen and −0.082 at the upper right end of the screen. That is, chromaticity change was small as compared with Comparative Example 1.

Examples 2 and 3 are the same as Example 1, except that the inclination angle of the LEDs is 50° and 60° respectively. In this case, the evaluation index Δv' was smaller than in Example 1.

Example 4 is the same as Example 1, except that LEDs having an inclination angle of 50° are arranged in a lattice. According to this, in-plane unevenness of the backlight unit was eliminated. Further, color unevenness of the display screen was improved.

Example 5 is configured such that the light emission surface is divided into a plurality of blocks and luminance adjustment of LEDs is performed in the block units. With this configuration, light leakage on the periphery of the backlight unit was reduced. Further, a difference in tint between the center and the end of the display screen was reduced.

In Example 6, an optically-compensatory film having a wavelength dispersion characteristic (referred to as reversed dispersion) with a phase difference ratio smaller than 1.0 was used under the conditions of Example 5. In Example 7, an optically-compensatory film having optical characteristics including dependency on the position of the light emission surface different at the center and on the periphery of the screen was used. In Example 7, a difference in tint between the center and the end of the display screen was reduced.

In Example 8, the amount of light from the display surface of the liquid crystal panel is detected under the condition of Example 7, and the configuration of the second embodiment is used in which feedback to the backlight unit is made. In this case, the evaluation index Δv' was reduced to −0.009 at the center of the screen.

In Example 9, the moisture content of the optically-compensatory film of the liquid crystal panel is detected under the condition of Example 7, and the configuration of the third embodiment is used in which feedback to the backlight unit is made.

In Example 10, the temperature of the liquid crystal panel is detected under the condition of Example 7, and the configuration of the fourth embodiment is used in which feedback to the backlight unit is made. In Examples 9 and 10, the evaluation index Δv' could be suppressed to be small.

In Example 11, control by the parameters of Examples 8, 9, and 10 was performed simultaneously, so the evaluation index Δv' could be suppressed to be small.

In Examples 8 to 10, moisture and temperature are detected and correction is made, and consequently an estimated retardation value is an "estimated value".

In Comparative Example 2, a VA mode liquid crystal panel was used with the LED inclination angle of 0°.

In Example 12, a VA mode liquid crystal panel was used, and the light emission surface was divided into a plurality of blocks, and LED luminance adjustment was performed in the block units.

In Example 13, a VA mode liquid crystal panel was used, and the optically-compensatory film had a reversed wavelength dispersion characteristic and dependency on the position of the light emission surface. In this case, the evaluation index Δv' was significantly reduced to −0.005 at the center of the screen and −0.009 at the upper right end of the screen.

In Example 14, control according to the parameters of light, moisture, and temperature is performed simultaneously under the condition of Example 13. The evaluation index Δv' was significantly reduced to −0.002 at the center of the screen and −0.007 at the upper right end of the screen.

In Example 14, moisture and temperature are detected and corrected, and as a result, an estimated retardation value is an "estimated value".

TABLE 2

| | Backlight Unit | | | Optically-Compensatory Film | | Liquid Crystal Panel | | | Liquid Crystal Cell Mode |
|---|---|---|---|---|---|---|---|---|---|
| | LED | Inclination Angle | Lattice Arrangement | Light Emission Surface Division | Change in Wavelength Dispersion Characteristic | Dependency on Position of Light Emission Surface | Light Detection | Moisture Detection | Temperature Detection | |
| Comparative Example 1 | ○ | — | — | — | — | — | — | — | — | TN |
| Example 1 | ○ | ○ | — | — | — | — | — | — | — | TN |
| Example 2 | ○ | ○ | — | — | — | — | — | — | — | TN |
| Example 3 | ○ | ○ | — | — | — | — | — | — | — | TN |
| Example 4 | ○ | ○ | ○ | — | — | — | — | — | — | TN |
| Example 5 | ○ | ○ | ○ | ○ | — | — | — | — | — | TN |
| Example 6 | ○ | ○ | ○ | ○ | ○ | — | — | — | — | TN |
| Example 7 | ○ | ○ | ○ | ○ | ○ | ○ | — | — | — | TN |
| Example 8 | ○ | ○ | ○ | ○ | ○ | ○ | ○ | — | — | TN |
| Example 9 | ○ | ○ | ○ | ○ | ○ | ○ | — | ○ | — | TN |
| Example 10 | ○ | ○ | ○ | ○ | ○ | ○ | — | — | ○ | TN |
| Example 11 | ○ | ○ | ○ | ○ | ○ | ○ | ○ | ○ | ○ | TN |
| Comparative Example 2 | ○ | — | — | — | — | — | — | — | — | VA |
| Example 12 | ○ | ○ | ○ | ○ | — | — | — | — | — | VA |
| Example 13 | ○ | ○ | ○ | ○ | ○ | ○ | — | — | — | VA |
| Example 14 | ○ | ○ | ○ | ○ | ○ | ○ | ○ | ○ | ○ | VA |

| | Backlight Unit | | | Change in Wavelength Dispersion Characteristic | Dependency on Position of Light Emission Surface | Estimated Value | | Actual Center | | Actual Right End | | Evaluation Index Chromaticity in Slanting Direction Δv' (D65) | |
|---|---|---|---|---|---|---|---|---|---|---|---|---|---|
| | Inclination Angle | In-plane unevenness | Peripheral Light Leakage | | | Re | Rth | Re | Rth | Re | Rth | Center | Upper Right End |
| Comparative Example 1 | 0° | Observed | Observed | Reversed Dispersion | Uniform over Entire Surface | 4.5 | 93.8 | 7.5 | 103.8 | 9.5 | 108.8 | −0.114 | −0.134 |
| Example 1 | 45° | Observed | Observed | Reversed Dispersion | Uniform over Entire Surface | 4.5 | 93.8 | 7.5 | 103.8 | 9.5 | 108.8 | −0.073 | −0.082 |
| Example 2 | 50° | Observed | Observed | Reversed Dispersion | Uniform over Entire Surface | 4.5 | 93.8 | 7.5 | 103.8 | 9.5 | 108.8 | −0.030 | −0.043 |
| Example 3 | 60° | Observed | Observed | Reversed Dispersion | Uniform over Entire Surface | 4.5 | 93.8 | 7.5 | 103.8 | 9.5 | 108.8 | −0.015 | −0.030 |
| Example 4 | 50° | Unobserved | Observed | Reversed Dispersion | Uniform over Entire Surface | 4.5 | 93.8 | 7.5 | 103.8 | 9.5 | 108.8 | −0.030 | −0.043 |
| Example 5 | 50° | Unobserved | Small | Reversed Dispersion | Uniform over Entire Surface | 4.5 | 93.8 | 7.5 | 103.8 | 9.5 | 108.8 | −0.030 | −0.043 |
| Example 6 | 50° | Unobserved | Small | Regular Dispersion | Uniform over Entire Surface | 4.5 | 93.8 | 7.5 | 103.8 | 9.5 | 108.8 | −0.036 | −0.058 |

TABLE 2-continued

| | | | | | | | | | | | | | |
|---|---|---|---|---|---|---|---|---|---|---|---|---|---|
| Example 7 | 50° | Unobserved | Small | Regular Dispersion | Observed | 4.5 | 93.8 | 7.5 | 103.8 | 9.5 | 108.8 | −0.036 | −0.058 |
| Example 8 | 50° | Unobserved | Small | Regular Dispersion | Observed | 4.5 | 93.8 | 7.5 | 103.8 | 9.5 | 108.8 | −0.009 | −0.046 |
| Example 9 | 50° | Unobserved | Small | Regular Dispersion | Observed | 5 | 95 | 7.5 | 103.8 | 9.5 | 108.8 | −0.034 | −0.056 |
| Example 10 | 50° | Unobserved | Small | Regular Dispersion | Observed | 6.5 | 100 | 7.5 | 103.8 | 9.5 | 108.8 | −0.018 | −0.056 |
| Example 11 | 50° | Unobserved | Small | Regular Dispersion | Observed | 7 | 102 | 7.5 | 103.8 | 9.5 | 108.8 | −0.009 | −0.046 |
| Comparative Example 2 | 0° | Unobserved | Small | Regular Dispersion | Observed | 60 | 120 | 66 | 132 | 68 | 136 | 0.200 | 0.118 |
| Example 12 | 50° | Unobserved | Small | Regular Dispersion | Observed | 60 | 120 | 66 | 132 | 68 | 136 | 0.062 | 0.059 |
| Example 13 | 50° | Unobserved | Small | Reversed Dispersion | Observed | 60 | 120 | 66 | 132 | 68 | 136 | −0.005 | −0.009 |
| Example 14 | 50° | Unobserved | Small | Reversed Dispersion | Observed | 65 | 130 | 66 | 132 | 68 | 136 | −0.002 | −0.007 |

INDUSTRIAL APPLICABILITY

The backlight unit of the invention is used, for example, in the liquid crystal display panel having the proper transmission light characteristic caused by the optically-compensatory film, and includes the light emission spectrum controlling unit for controlling separately the light emission spectra in the front direction which becomes the normal direction of the light emission surface and the slanting direction inclined at a predetermined angle from the normal direction. Therefore, directivity and light emission intensity can be controlled separately for each of the R, G, and B colors, chromaticity (spectrum) can be varied in the front direction and the slanting direction, and viewing angle dependency of tint of a display image can be improved. Then, the backlight unit is assembled with the liquid crystal panel, so a high-quality liquid crystal display image with no tint when viewed from the slanting direction can be obtained.

Although the invention has been described in detail with reference to specific embodiments, it will be apparent to those skilled in the art that various changes or modifications may be made without departing from the spirit and scope of the invention.

This application claims priority of Japanese Patent Application No. 2007-155087 filed on Jun. 12, 2007, Japanese Patent Application No. 2007-256683 filed on Sep. 28, 2007, and Japanese Patent Application No. 2008-151376 filed on Jun. 10, 2008, the contents of which are incorporated herein by reference.

The invention claimed is:

1. A backlight unit of a just-beneath type with a plurality of light sources below a light emission surface, the backlight unit comprising:
a light emission spectrum controlling unit for separately controlling light emission spectra in a front direction which becomes a normal direction to the light emission surface and a slanting direction inclined at a predetermined angle from the normal direction,
wherein the plurality of light sources are a plurality of LED elements which are different in a light emission color, and each light source independently includes a first LED element with the front direction as an optical axis of emission light and a second LED element with the slanting direction as an optical axis of emission light for each light emission color, and
the light emission spectrum controlling unit changes light emission intensity for the second LED element for each light emission color.

2. The backlight unit according to claim 1,
wherein a plurality of multi-directional irradiation units each having the first LED element and the second LED element as a single body are dispersed below the light emission surface.

3. The backlight unit according to claim 2,
wherein the multi-directional irradiation units of light emission colors are arranged in a lattice.

4. The backlight unit according to claim 1,
wherein the light emission surface is divided into a plurality of blocks, and
the light emission spectrum controlling unit controls light emission intensity of the first LED element and the second LED element included in each of the blocks separately for each block.

5. The backlight unit according to claim 1,
wherein an optically-compensatory film having wavelength dependency and transmittance varying according to the position of the light emission surface is arranged on the light emission surface.

6. A liquid crystal display comprising:
the backlight unit according to claim 1; and
a liquid crystal panel arranged facing the backlight unit.

7. The liquid crystal display according to claim 6, further comprising:
a light detection unit provided in the liquid crystal panel for detecting light information from the light source emitted from the liquid crystal panel,
wherein the light emission spectrum controlling unit changes light emission intensity for the second LED element on the basis of the light information detected by the light detection unit.

8. The liquid crystal display according to claim 6, further comprising:
a moisture detection unit provided in the liquid crystal panel for detecting moisture information of the liquid crystal panel,
wherein the light emission spectrum controlling unit changes light emission intensity for the second LED element on the basis of the moisture information detected by the moisture detection unit.

9. The liquid crystal display according to claim 6, further comprising:
a temperature detection unit provided in the liquid crystal panel for detecting temperature information of the liquid crystal panel,
wherein the light emission spectrum controlling unit changes light emission intensity for the second LED element on the basis of the temperature information detected by the temperature detection unit.

10. The liquid crystal display according to claim 6, wherein an optically-compensatory film having wavelength dependency of transmittance is provided in the liquid crystal panel.

11. The liquid crystal display according to claim 10, wherein the optically-compensatory film is an optically-compensatory film having transmittance varying according to the position of a display surface.

12. The liquid crystal display according to claim 6, wherein the second LED element has the optical axes of emission light controlled in two directions substantially equal in an inclination angle with the front direction as the center in a plane parallel to the front direction, and,
the liquid crystal panel is a TN (Twisted Nematic) liquid crystal panel.

13. The liquid crystal display according to claim 6, wherein the second LED element has the optical axes of emission light controlled in a total of four directions provided by inclining, in a first plane parallel to the front direction, two directions, which are controlled to directions substantially equal in an inclination angle with the front direction as the center, at an angle substantially equal in a direction orthogonal to the first plane with the first plane as the center, and
the liquid crystal panel is a VA (Vertically Aligned) liquid crystal panel.

\* \* \* \* \*